US011651326B2

(12) United States Patent
Abebe et al.

(10) Patent No.: US 11,651,326 B2
(45) Date of Patent: May 16, 2023

(54) AUTOMATICALLY PREDICTING SHIPPER BEHAVIOR USING MACHINE LEARNING MODELS

(71) Applicant: United Parcel Service of America, Inc., Atlanta, GA (US)

(72) Inventors: Ted Abebe, Jersey City, NJ (US); Ed Hojecki, Atlanta, GA (US); Ilya Lavrik, Atlanta, GA (US); Vinay Rao, Wayne, NJ (US); Donald Hickey, Atlanta, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 1022 days.

(21) Appl. No.: 16/197,084

(22) Filed: Nov. 20, 2018

(65) Prior Publication Data

US 2019/0156283 A1 May 23, 2019

Related U.S. Application Data

(60) Provisional application No. 62/589,821, filed on Nov. 22, 2017.

(51) Int. Cl.
*G06Q 10/08* (2012.01)
*G06Q 10/083* (2023.01)
(Continued)

(52) U.S. Cl.
CPC ....... *G06Q 10/0838* (2013.01); *G06K 9/6217* (2013.01); *G06K 9/6282* (2013.01);
(Continued)

(58) Field of Classification Search
CPC .. G06Q 10/04; G06Q 10/083; G06Q 10/0833; G06Q 10/0838; G06Q 10/08;
(Continued)

(56) References Cited

U.S. PATENT DOCUMENTS 7,423,581 B2 * 9/2008 Fujikawa ............. G01S 7/2923
342/159
9,563,670 B2 * 2/2017 Wasson ............... G06F 16/2465
(Continued)

FOREIGN PATENT DOCUMENTS

WO 2011/038018 A1 3/2011
WO 2014/205273 A2 12/2014

OTHER PUBLICATIONS

Patel et al.,"Using Multiple Models to Understand Data,"2011,Published by AAAI Press, Proceeding so fthe International Joint Conferenceon Artificial Intelligence (IJCAI 2011).pp. 1723-1728 (Year: 2011).*
(Continued)

*Primary Examiner* — Andrew Joseph Rudy
(74) *Attorney, Agent, or Firm* — Shook, Hardy & Bacon, L.L.P.

(57) ABSTRACT

Embodiments are disclosed for autonomously predicting shipper behavior. An example method includes the following operations. One or more learning models are generated. Shipper behavior data for at least one shipper is extracted. The shipper behavior data includes a plurality of features associated with the at least one shipper scheduled to ship one or more parcels. It is predicted whether one or more shipments will be sent or arrive at a particular time based at least in part on running the plurality of features of the at least one shipper through the one or more learning models.

18 Claims, 13 Drawing Sheets

(51) Int. Cl.
*G06K 9/62* (2022.01)
*G06N 20/00* (2019.01)
*G06Q 10/0833* (2023.01)
*G06Q 10/04* (2023.01)

(52) U.S. Cl.
CPC ............. *G06N 20/00* (2019.01); *G06Q 10/04* (2013.01); *G06Q 10/083* (2013.01); *G06Q 10/0833* (2013.01)

(58) Field of Classification Search
CPC ...... G06N 20/00; G06N 7/005; G06N 3/0454; G06N 5/003; G06N 5/025; G06N 5/022; G06N 5/02; G06K 9/6217; G06K 9/6282; G06K 9/62; G06K 9/6223
USPC .................................. 705/7.31, 333; 706/12
See application file for complete search history.

(56) References Cited

U.S. PATENT DOCUMENTS

| | | | |
|---|---|---|---|
| 9,569,745 B1* | 2/2017 | Ananthanarayanan | G01C 21/343 |
| 10,832,268 B2* | 11/2020 | Binkiewicz | G06Q 30/0633 |
| 11,145,020 B1* | 10/2021 | Black | G06Q 10/083 |
| 2012/0130927 A1* | 5/2012 | Shimogori | G06N 20/00 706/12 |
| 2014/0278637 A1* | 9/2014 | Davidson | G06Q 10/063114 705/7.15 |
| 2015/0032540 A1* | 1/2015 | Narasimhan | G06Q 30/0256 705/14.53 |
| 2015/0363843 A1 | 12/2015 | Loppatto et al. | |
| 2016/0063583 A1* | 3/2016 | Nuthulapati | G06Q 10/083 705/26.2 |
| 2016/0350712 A1* | 12/2016 | Wesemann | G06Q 10/0834 |
| 2017/0154347 A1 | 6/2017 | Bateman | |
| 2018/0189265 A1* | 7/2018 | Chen | G06N 7/005 |
| 2018/0240066 A1* | 8/2018 | Streebin | G06Q 10/0838 |
| 2019/0080799 A1* | 3/2019 | Galuten | G06N 5/04 |
| 2021/0090017 A1* | 3/2021 | Reiss | G06Q 10/0833 |

OTHER PUBLICATIONS

International Search Report and Written Opinion received for PCT Patent Application No. PCT/US2018/062185, dated Feb. 12, 2019, 13 pages.

* cited by examiner

AUTOMATICALLY PREDICTING SHIPPER BEHAVIOR USING MACHINE LEARNING MODELS

CROSS-REFERENCE TO RELATED APPLICATIONS

This application claims priority to U.S. Provisional Patent Application No. 62/589,821 entitled "SYSTEMS AND METHODS FOR AUTOMATICALLY PREDICTING SHIPPER BEHAVIOR USING MACHINE LEARNING MODELS," filed Nov. 22, 2017, which is incorporated herein by reference in its entirety.

FIELD

The present disclosure relates to using data analytics technology to predict shipper behavior, and, more particularly, to using gathered shipper behavioral data and machine learning models to generate shipper behavior predictions.

BACKGROUND

When parcels (e.g., packages, containers, letters, items, pallets or the like) are received from shippers and transported from an origin to a destination, the process of transmitting the packages may include moving the packages through various intermediate locations between its origin and destination, such as sorting operation facilities. Processing and sorting at these facilities may include various actions, such as culling where parcels are separated according to shape or other characteristics, capturing information from the parcel to retrieve shipping information (e.g., tracking number, destination address, etc.), organizing the parcels according to a shipment destination, and loading the parcels into a delivery vehicle. Resources such as human resources and equipment are utilized to facilitate each step of the transportation of the package. Efficiently allocating resources throughout the chain of delivery depends on accurately predicting information about each leg of the transportation process.

Generating predictions regarding when a package will be sent or received from shippers has historically been unreliable. Analyzing package manifests (reports received from shippers before they send packages to a carrier) are one solution to this problem. However, conventional package manifest are subject to human error, and in reality, a shipper may not behave exactly in accordance with the package manifest. Further, existing prediction technologies use static threshold scores to predict all shipping behavior, which makes the predictions less accurate and relevant for any one given shipper. Accordingly, there is a need for tools that improved existing prediction technologies.

SUMMARY

Example embodiments described herein comprise systems that autonomously predicts shipper behavior. The details of some embodiments of the subject matter described in this specification are set forth in the accompanying drawings and the description below. Other features, aspects, and advantages of the subject matter will become apparent from the description, the drawings, and the claims. Various embodiments are directed to an apparatus, a method, and a system for predicting shipper behavior.

In some aspects, the apparatus for autonomously predicting shipper behavior includes at least one non-transitory computer-readable storage medium that includes program instructions. In some aspects, the program instructions are executable by one or more processors to cause the one or more processors to perform the following operations. One or more shipper information units are accessed from a shipper behavioral data management tool. The one or more shipper information units comprise shipper behavioral data associated with one or more shippers. The shipper behavioral data comprises one or more of: package received time, manifest package time, and package information. One or more features are extracted from the one or more shipper information units. An output comprising a shipper behavior prediction for the shipper is generated via a shipper behavior learning model and the one or more features.

In some aspects, the method for autonomously predicting shipper behavior includes the following operations. One or more learning models are generated. Shipper behavior data for at least one shipper is extracted. The shipper behavior data includes a plurality of features associated with the at least one shipper scheduled to ship one or more parcels. It is predicted whether one or more shipments will be sent or arrive at a particular time based at least in part on running the plurality of features of the at least one shipper through the one or more learning models.

In some aspects, the system includes at least one computing device having at least one processor and at least one computer readable storage medium having program instructions embodied therewith. In some aspects, the program instructions are readable/executable by the at least one processor to cause the system to perform the following operations. One or more learning models are generated. Shipper behavior data is extracted. The shipper behavior data includes a plurality of features of at least one package associated with one or more shipping operations of at least one shipper. A prediction output corresponding to a size of the at least one package is generated based at least in part on running the plurality of features of the at least one package through the one or more learning models.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF FIGS

Having thus described the disclosure in general terms, reference will now be made to the accompanying drawings, which are not necessarily drawn to scale, and wherein:

FIG. 1 provides an illustration of an exemplary embodiment of the present disclosure;

FIG. 2 provides a schematic of a shipper behavior predicting entity according to one embodiment of the present disclosure;

FIG. 3 provides an illustrative schematic representative of a mobile computing entity 110 that can be used in conjunction with embodiments of the present disclosure;

DETAILED DESCRIPTION

Figure 1:
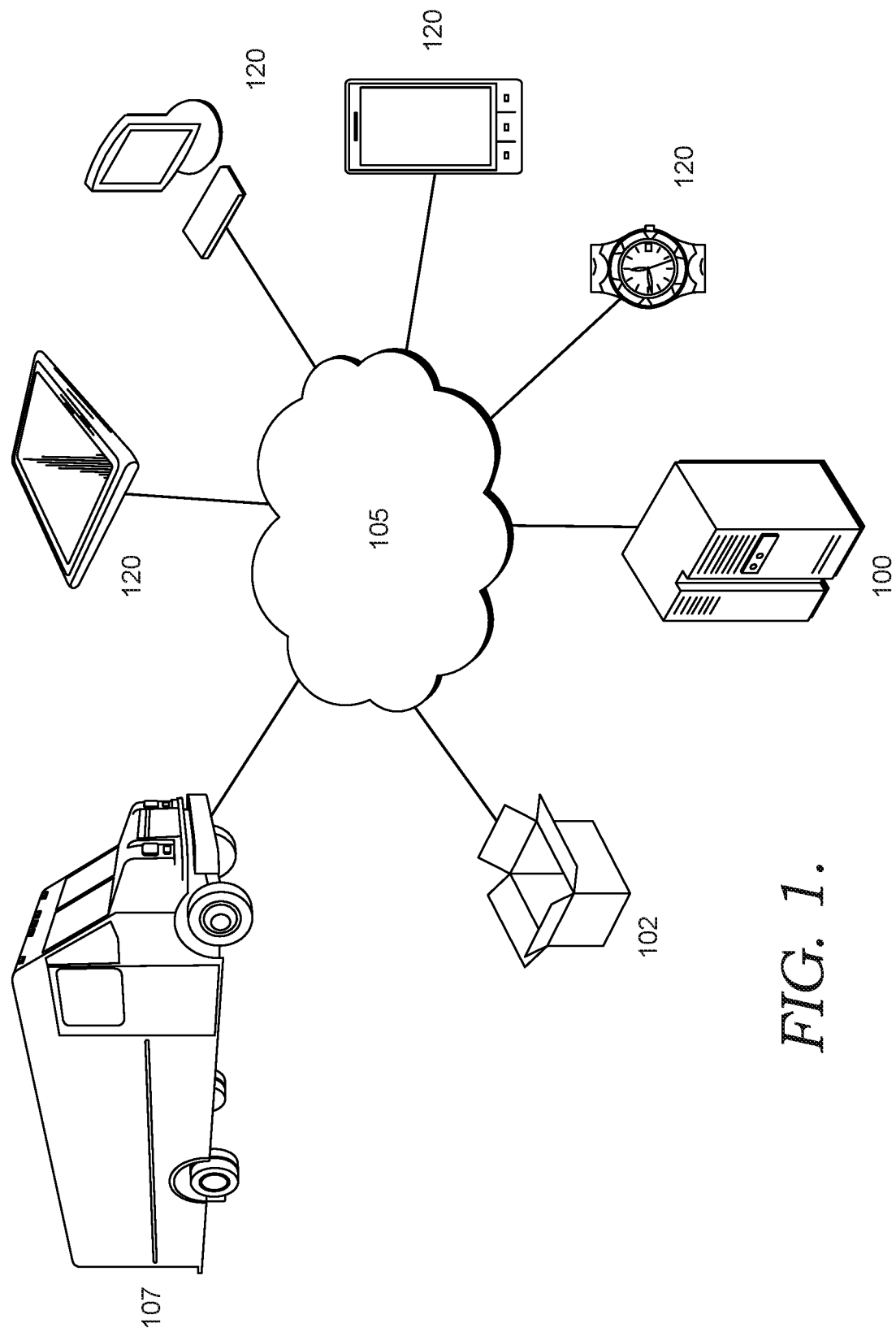

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. OVERVIEW

Existing software technologies have various shortcomings. For example, various shipping prediction software technologies only compute data in response to manual user input. In an illustrative example, some software technologies display an identifier that prompts a first user to input a planned package pick up time in his or her package manifest. In response to the first user inputting these details into a field, existing technologies receive this data and process the data based on additional manual user input. For example, a second user (e.g., a carrier driver/sorting facility worker) may determine if the planned pick up time as indicated in the package manifest will be late, early, and/or on time. Existing software technologies may include static identifiers or other graphical user interface (GUI) features that specify "late," "early," and "on time," and prompt the second user to manually select one of the identifiers or manually type whether the planned pickup time will be late, early, or on time. The second user must manually input this manifest information each time these package manifests or other data is received from shippers. However, continuous manual input of this information is time consuming, tedious, and often leads to inaccurate predictions. For example, a user may have a history of inputting planned pickup times that are much later than actual pickup times. Accordingly, in this situation existing technologies may only analyze the entered planned pickup time for a single delivery to make a prediction, instead of analyzing historical user patterns, thereby making the prediction inaccurate.

Some existing software technologies also have shortcomings in that they continually prompt users to input the same information regardless of what past user behavior, selections, or information have been received as input. Accordingly, these technologies may output the same displayed information or require users to input the same information every time they receive a package manifest, for example. In an example illustration, the same user may always send a particular package on the same day every month, which is received by a carrier entity around the same time period. However, existing software technologies may indefinitely, each time a package manifest or other shipper data is received, store a static indication or prediction (e.g., select a GUI button indicating package will be "late") concerning when the package will be received. This can increase storage device I/O (e.g., excess physical read/write head movements on non-volatile disk) because each time the system stores unnecessary and redundant information (e.g., storing the same information that a package will be "late" after each package manifest received from the same user every month), the computing system often has to repetitively reach out to the storage device to perform a read or write operation, which is time consuming, error prone, and can eventually wear on components, such as a read/write head.

Various embodiments of the present disclosure improve these existing software technologies via new functionalities that these existing technologies or computing devices do not now employ. Further, various embodiments improve various computer operations and resources (e.g., disk I/O). For example, some embodiments improve existing software technologies by automating tasks (e.g., automatically predicting the size of a parcel and/or when a parcel will be received) via certain rules. As described above, such tasks are not automated in various existing technologies and have only been historically performed by manual input of human users. In particular embodiments, incorporating these certain rules (e.g., learning model branch node tests) improve existing technological processes by allowing the automation of these certain tasks, which is described in more detail below. Particular embodiments also improve these existing software technologies by learning (e.g., via machine learning models) past user behavior, such as selections and input, in order to generate and compute certain data, such as generating a prediction of a size of a parcel and/or when a parcel will be received. In this way, users do not have to keep manually entering the same information for each package manifest or other data received. Accordingly, because users do not have to keep manually entering the same information, storage device I/O is reduced. For example, a read/write head in various embodiments reduces the quantity of times it has to write data to a storage device, which may reduce the likelihood of write errors and breakage of the read/write head. Some embodiments also improve these existing software technologies by some or each of the processes, as described below with reference to FIGS. 1-11 of the present disclosure.

II. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXAMPLE DEFINITIONS

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices/entities, such as, for example, one or more servers, relays, routers, network access points, base stations, hosts, and/or the like, sometimes referred to herein as a "network." Similarly, where a computing device is described herein to transmit data to another computing device, it will be appreciated that the data may be sent directly to another computing device or may be sent indirectly via one or more intermediary computing devices/entities, such as, for example, one or more servers, relays, routers, network access points, base stations, hosts, and/or the like.

The terms "package", "parcel, "item," and/or "shipment" refer to any tangible and/or physical object, such as a wrapped package, a container, a load, a crate, items banded together, an envelope, suitcases, vehicle parts, pallets, drums, vehicles, and the like sent through a delivery service from a first geographical location to one or more other geographical locations.

The term "carrier" and/or "shipping service provider" (used interchangeably) refer to a traditional or nontraditional carrier/shipping service provider. A carrier/shipping service provider may be a traditional carrier/shipping service provider, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. A carrier/shipping service provider may also be a nontraditional carrier/shipping service provider, such as Amazon, Google, Uber, ride-sharing services, crowd-sourcing services, retailers, and/or the like.

The term "shipper behavioral data" refers to data describing a shipper's behavior. In some embodiments, the shipper behavioral data comprises one or more package received time, manifest package time, package information such as tracking number, package activity time stamp, package dimension including height, length and width, package weight, package manifested weight, package manifest time stamp, package service type, package scanned time stamp, package tracking number, package sort type code, package scanned code, unit load device type code, account number associated with the package, and the like. In some embodiments, shipper behavioral data may be received from vehicles or mobile computing entities. In some embodiments, the shipper behavioral data is included in one or more package manifests.

The term "shipper behavior data management tool" refers to a management tool that centrally collects and manages shipper behavior data. The shipper behavior data may be provided by different service points, vehicles, mobile computing entities, and any other electronic devices that gather shipper behavior data. Alternatively or in addition, the shipper behavior data management tool may receive shipper behavior data directly from a distributed computing entity. In some embodiments, the shipper behavior data management tool is embedded within shipper behavior predicting entity.

The term "shipper information units" refers to a set of data that has been normalized and parsed based on shipper behavioral data. The process of parsing the shipper behavioral data may comprise selectively copying shipper behavioral data based on the tuning of a shipper behavior learning model. For instance, in some embodiments, certain elements of the shipper behavioral data would not necessarily be needed by the shipper behavior learning model. The shipper information units in such instances refer to the subset of shipper behavioral data that does not contain those certain elements of the shipper behavioral data, and the parsing and normalization process eliminates those certain elements prior to the remaining data being fed into the shipper behavior learning model.

The term "feature" in various contexts refers to data generated based on shipper information units and subsequently fed into a machine learning model. In some embodiments, the features are equivalent to shipper information units. Alternatively or in addition, the features can be generated by other techniques. For example, if the shipper information unit comprises "manifest time: 9:00 am; received time: 10:04 am; package weight: 30 lb", the features generated can be based on categorization of each of the elements present in the shipper information unit in the form of "manifest time: morning; received time: morning; package weight: heavy". In some embodiments, one feature may be generated based on multiple shipper information units. For example, package received time for multiple occasions can be used to generate one feature. A shipper behavior prediction engine may use shipper information units that represents package manifest time and package received time in the past two months and generate a feature called "percentage of early manifests in the past two months".

The term "package manifest" refers to a report provided by a shipper to a shipping service provider that summarizes the shipment information about the package that the shipper is going to provide to the shipping service provider. A package manifest may include the shipper's account information, shipping record identifier, dimensions of the package to be picked up, a planned package pick up time, a package pick up location, package weight, and the like.

The term "manifest package time" refers to the planned package pick up and/or delivery time in the package manifest. For example, a shipper may request that a shipping service provider send a driver to pick up a package at a certain location (manifest package location) at a manifest package time.

The term "package timeliness" refers to a shipper's timeliness in providing the shipper's package to a shipping service provider with respect to the manifest package time or other criteria. For example, a shipper may indicate that the shipper is going to provide a package to the service provider on 2:00 pm on Thursday, and if the shipper provides the shipping service provider with the package at 2:00 pm on Thursday, then the shipper would be categorized as a "timely shipper" with respect to that package. In some embodiments, providing the package within a certain window before or after 2:00 pm on Thursday would still result in the shipper being categorized as a timely shipper. However, if the shipper provides the package late by a certain predefined amount of time, the shipper would be categorized as a "late shipper" in some embodiments. And if the shipper provides the package early by a certain predefined amount of time, then the shipper would be categorized as an "early shipper" in some embodiments.

The term "package received time" refers to the actual time where the package is received by a shipping service provider (e.g., a sorting facility or a delivery driver) from a shipper or other entity.

The term "indicator" refers to data that indicates certain attributes. For example, a residential indicator indicates whether a package is being sent to residential address, a hazardous material indicator indicates whether a package contains hazardous material, an oversize indicator indicates whether a package is oversized, a document indicator indicates whether a package is a document, and a Saturday delivery indicator indicates whether a package is planned to be delivered on a Saturday.

The term "package activity time stamp" refers to a time stamp generated based on the time-stamp data acquired when performing package activities. For example, a package time activity time stamp may be a time stamp generated when the package is received from the shipper, a time stamp generated when the package is sent from a receiving site to an intermediate transmit vehicle, a time stamp generated when the package is sent from an intermediate transmit vehicle to another vehicle, and the like.

The term "building type" refers to the categorization of a building operated by a shipping service provider. For example, buildings may be categorized by size, average inbound and/or outbound volume, location, purpose of the building (intermediate transit or stores facing customers, etc.), and the like.

The term "service type" refers to the categorization of the service provided associated with the package. For example, service type may be categorized by delivery speed, return receipt requested, insurance associated with the package, originating location, destination location, and the like. Exemplary service types include "Next Day Air", "$2^{nd}$ day Air", "Worldwide Express", "Standard", and the like.

The term "sort type" refers to the categorization of time in hours/minutes of package received time. An exemplary way of defining sort type is provided as the following:

Package receive between 10:00 pm and 5:00 am: Sort type "Late night";

Package receive between 5:00 am and 8:00 am: Sort type "Early Morning";

Package receive between 8:00 am and 2:00 pm: Sort type "Morning to early afternoon";

Package receive between 2:00 pm and 10:00 am: Sort type "Afternoon to Night".

Packages can be categorized by sort types defined using different names and different defined time period. Each defined category is called a "sort".

The term "account type" refers to the categorization of the shipper account associated with the package. For example, account type may be categorized by whether the shipper is a personal shipper or a business shipper, by the frequency with which the shipper provides packages, by the service type requested, or by other shipping information associated with an account of the shipper. The shipping information may be processed before being used to categorize account type. For example, if a personal shipper ships ten packages per month, a server may first process the shipping information associated with the ten packages and generate an indicator of frequency of shipping for the shipper, then categorize the shipper's account type as "frequent—personal shipper".

The term "shipper behavior learning model," "machine learning model," "learning model" or the like refers to a machine learning model that uses features generated from shipper information units and/or shipper behavior data to predict shipper behavior. A machine learning model can encompass one or more input data (e.g., shipper information units), target variables, layers, classifiers, etc. In various embodiments, a machine learning model can receive an input (e.g., new package manifest data/shipper behavior data), and based on the input identify patterns or associations in order to predict a given output (e.g., classify a shipping package as small or large; classify a shipper as late or early, etc.). Machine learning models can be or include any suitable model, such as one or more: neural networks, word2Vec models, Bayesian networks, Random Forests, Boosted Trees, etc. "Machine learning" as described herein, in particular embodiments, corresponds to algorithms that parse or extract features of historical data (e.g., historical package manifests/shipper behavioral data/shipper information units), learn (e.g., via training) about the historical data by making observations or identifying patterns in the historical data, and then receive a subsequent input (e.g., a current package manifest/shipper behavioral data/shipper information units) in order to make a determination, prediction, and/or classification of the subsequent input based on the learning without relying on rules-based programming (e.g., conditional statement rules).

The term "gradient boosting based learning model" refers to a machine learning model for classification, regression and other tasks that operate by producing a prediction model in the form of an ensemble of weak prediction models, typically decision trees.

The term "random forest" based learning model refers to a machine learning model for classification, regression and other tasks that operate by constructing a multitude of decision trees at training time and outputting the class or mean prediction of the individual trees.

The term "learning rate" refers to a weighting factor for the corrections by new trees when added to a gradient boosting based learning model.

IV. EXAMPLE SYSTEM ARCHITECTURE

FIG. 1 provides an illustration of an exemplary embodiment of the present invention. As shown in FIG. 1, this particular embodiment may include one or more shipper behavior predicting entities 100 that each comprise a shipper behavior prediction engine, one or more package/items/shipments 102, one or more networks 105, one or more vehicles 107, one or more mobile computing entities 120, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Shipper Behavior Predicting Entity

Figure 2:
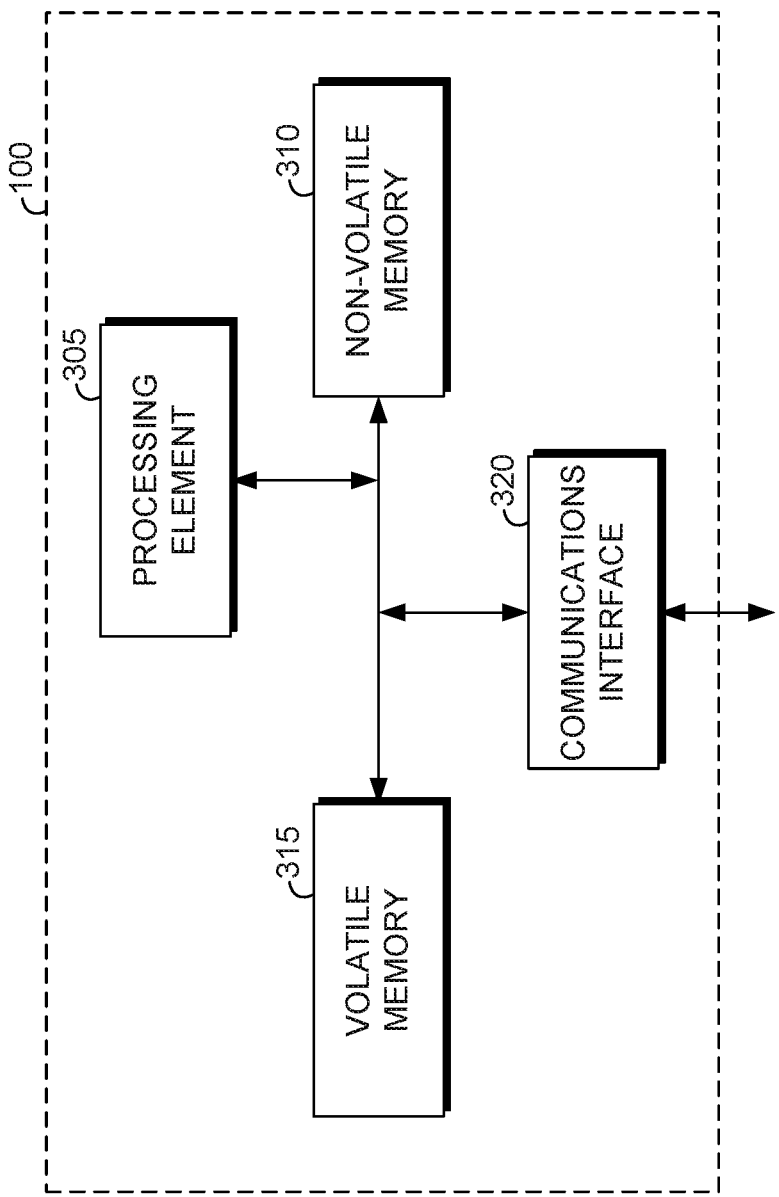

FIG. 2 provides a schematic of a shipper behavior predicting entity 100 according to one embodiment of the present invention. The shipper behavior predicting entity 100 may comprise shipper behavioral data management tool and shipper behavior predicting engine among other modules. In certain embodiments, the shipper behavior predicting entity 100 may be maintained by and/or accessible by a carrier. A carrier may be a traditional carrier, such as United Parcel Service (UPS), FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. In general, the terms computing entity, computer, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the shipper behavior predicting entity 100 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the shipper behavior predicting entity 100 may include or be in communication with one or more processing elements 305 (also referred to as processors, processing circuitry, processing devices, and/or similar terms used herein interchangeably) that communicate with other elements within the shipper behavior predicting entity 100 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), microcontrollers, and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly. For example, processing element may be configured to perform various functionality of a shipper behavior prediction engine, such as In one embodiment, the shipper behavior predicting entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The terms database, database instance, database management system, and/or similar terms used herein interchangeably may refer to a structured collection of records or data that is stored in a computer-readable storage medium, such as via a relational database, hierarchical database, hierarchical database model, network model, relational model, entity—relationship model, object model, document model, semantic model, graph model, and/or the like.

In one embodiment, the shipper behavior predicting entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 305. Thus, the databases, database instances, database management systems, data, applications, programs, program modules, scripts, source code, object code, byte code, compiled code, interpreted code, machine code, executable instructions, and/or the like may be used to control certain aspects of the operation of the shipper behavior predicting entity 100 with the assistance of the processing element 305 and operating system.

As indicated, in one embodiment, the shipper behavior predicting entity 100 may also include one or more communications interfaces 320 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the shipper behavior predicting entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Bluetooth protocols, Wibree, Home Radio Frequency (HomeRF), Simple Wireless Abstract Protocol (SWAP), wireless universal serial bus (USB) protocols, and/or any other wireless protocol.

Although not shown, the shipper behavior predicting entity 100 may include or be in communication with one or more input elements, such as a keyboard input, a mouse input, a touch screen/display input, motion input, movement input, audio input, pointing device input, joystick input, keypad input, and/or the like. The shipper behavior predicting entity 100 may also include or be in communication with one or more output elements (not shown), such as audio output, video output, screen/display output, motion output, movement output, and/or the like.

In some embodiments, processing element 305, non-volatile memory 310 and volatile memory 315 may be configured to support a shipper behavior predicting engine. For example, processing element 305 may be configured to execute operations that comprise the shipper behavior predicting engine, and non-volatile memory 310 and volatile memory 315 may be conFIG. to store computer code executed by the processing element 305, as well as to store relevant intermediate or ultimate results produced from execution of the shipper behavior prediction engine.

In some embodiments, processing element 305, non-volatile memory 310 and volatile memory 315 may be configured to support a shipper behavioral data management tool. For example, processing element 305 may be configured to execute operations that comprise the shipper behavioral data management tool, and non-volatile memory 310 and volatile memory 315 may be conFIG. to store computer code executed by the processing element 305, as well as to store relevant intermediate or ultimate results produced from execution of the shipper behavioral data management tool.

As will be appreciated, one or more of the shipper behavior predicting entity's 100 components may be located remotely from other shipper behavior predicting entity 100 components, such as in a distributed system. Furthermore, one or more of the components may be combined and additional components performing functions described herein may be included in the shipper behavior predicting entity 100. Thus, the shipper behavior predicting entity 100 can be adapted to accommodate a variety of needs and circumstances. As will be recognized, these architectures and descriptions are provided for exemplary purposes only and are not limited to the various embodiments.

2. Exemplary Vehicle

In various embodiments, the term vehicle 107 is used generically. For example, a carrier/transporter vehicle 107 may be a manned or unmanned tractor, a truck, a car, a motorcycle, a moped, a Segway, a bicycle, a golf cart, a hand truck, a cart, a trailer, a tractor and trailer combination, a van, a flatbed truck, a vehicle, an unmanned aerial vehicle (UAV) (e.g., a drone), an airplane, a helicopter, a boat, a barge, and/or any other form of object for moving or transporting people and/or items/shipments (e.g., one or more packages, parcels, bags, containers, loads, crates, items banded together, vehicle parts, pallets, drums, the like, and/or similar words used herein interchangeably). In one embodiment, each vehicle 107 may be associated with a unique vehicle identifier (such as a vehicle ID) that uniquely identifies the vehicle 107. The unique vehicle ID (e.g., trailer ID, tractor ID, vehicle ID, and/or the like) may include characters, such as numbers, letters, symbols, and/or the like. For example, an alpha, numeric, or alphanumeric vehicle ID (e.g., "AS") may be associated with each vehicle 107. In another embodiment, the unique vehicle ID may be the license plate, registration number, or other identifying information/data assigned to the vehicle 107. As noted above, in instances where the vehicle is a carrier vehicle, the vehicle may be a self-driving delivery vehicle or the like. Thus, for the purpose of the present disclosure, the term driver of a delivery vehicle may be used to refer to a carrier personnel who drives a delivery vehicle and/or delivers items/shipments therefrom, an autonomous system configured to deliver items/shipments (e.g., a robot configured to transport items/shipments from a vehicle to a service point such as a customer's front door or other service point), and/or the like.

Various computing entities, devices, and/or similar words used herein interchangeably can be associated with the vehicle 107, such as a data collection device or other computing entities. In general, the terms computing entity, entity, device, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. The data collection device may collect telematics information/data (including location information/data) and transmit/send the information/data to an onboard computing entity, a distributed computing entity, and/or various other computing entities via one of several communication methods.

In one embodiment, the data collection device may include, be associated with, or be in wired or wireless communication with one or more processors (various exemplary processors are described in greater detail below), one or more location-determining devices or one or more location sensors (e.g., Global Navigation Satellite System (GNSS) sensors), one or more telematics sensors, one or more real-time clocks, a J-Bus protocol architecture, one or more electronic control modules (ECM), one or more communication ports for receiving telematics information/data from various sensors (e.g., via a CAN-bus), one or more communication ports for transmitting/sending information/data, one or more RFID tags/sensors, one or more power sources, one or more data radios for communication with a variety of communication networks, one or more memory modules 410, and one or more programmable logic controllers (PLC). It should be noted that many of these components may be located in the vehicle 107 but external to the data collection device.

In one embodiment, the one or more location sensors, modules, or similar words used herein interchangeably may be one of several components in wired or wireless communication with or available to the data collection device. Moreover, the one or more location sensors may be compatible with GPS satellites, such as Low Earth Orbit (LEO) satellite systems, Department of Defense (DOD) satellite systems, the European Union Galileo positioning systems, Global Navigation Satellite systems (GLONASS), the Chinese Compass navigation systems, Indian Regional Navigational satellite systems, and/or the like. Furthermore, the one or more location sensors may be compatible with Assisted GPS (A-GPS) for quick time to first fix and jump start the ability of the location sensors to acquire location almanac and ephemeris data, and/or be compatible with Satellite Based Augmentation System (SBAS) such as Wide Area Augmentation System (WAAS), European Geostationary Navigation Overlay Service (EGNOS), and/or MTSAT Satellite Augmentation System (MSAS), GPS Aided GEO Augmented Navigation (GAGAN) to increase GPS accuracy. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, triangulation may be used in connection with a device associated with a particular vehicle 107 and/or the vehicle's operator and with various communication points (e.g., cellular towers or Wi-Fi access points) positioned at various locations throughout a geographic area to monitor the location of the vehicle 107 and/or its operator. The one or more location sensors may be used to receive latitude, longitude, altitude, heading or direction, geocode, course, position, time, and/or speed data (e.g., referred to herein as telematics information/data and further described herein below). The one or more location sensors may also communicate with the shipper behavior predicting entity, the data collection device, distributed computing entity, user computing entity, and/or similar computing entities.

As indicated, in addition to the one or more location sensors, the data collection device may include and/or be associated with one or more telematics sensors, modules, and/or similar words used herein interchangeably. For example, the telematics sensors may include vehicle sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics information/data). The telematics sensors may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological data (e.g., referred to herein as telematics information/data).

In one embodiment, the ECM may be one of several components in communication with and/or available to the data collection device. The ECM, which may be a scalable and subservient device to the data collection device, may have data processing capability to decode and store analog and digital inputs from vehicle systems and sensors. The ECM may further have data processing capability to collect and present telematics information/data to the J-Bus (which may allow transmission to the data collection device), and output standard vehicle diagnostic codes when received from a vehicle's J-Bus-compatible on-board controllers 440 and/or sensors.

As indicated, a communication port may be one of several components available in the data collection device (or be in or as a separate computing entity). Embodiments of the communication port may include an Infrared Data Association (IrDA) communication port, a data radio, and/or a serial port. The communication port may receive instructions for the data collection device. These instructions may be specific to the vehicle 107 in which the data collection device is installed, specific to the geographic area in which the vehicle 107 will be traveling, specific to the function the vehicle 107 serves within a fleet, and/or the like. In one embodiment, the data radio may be configured to communicate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth, USB, Wibree, HomeRF, SWAP, and/or the like.

3. Exemplary Package/Item/Shipment

A package/item/shipment 102 may be any tangible and/or physical object. Such items/shipments 102 may be picked up and/or delivered by a carrier/transporter. In one embodiment, an package/item/shipment 102 may be or be enclosed in one or more packages, parcels, bags, containers, loads, crates, items banded together, vehicle parts, pallets, drums, the like, and/or similar words used herein interchangeably. Such items/shipments 102 may include the ability to communicate (e.g., via a chip (e.g., an integrated circuit chip), RFID, NFC, Bluetooth, Wi-Fi, and any other suitable communication techniques, standards, or protocols) with one another and/or communicate with various computing entities for a variety of purposes. For example, the package/item/shipment 102 may be configured to communicate with a mobile computing entity 120 using a short/long range communication technology, as described in more detail below. Further, such package/items/shipments 102 may have the capabilities and components of the described with regard to the occupancy computing entities 100, networks 105, vehicles 107, user computing entities 120, and/or the like. For example, the package/item/shipment 102 may be configured to store package/item/shipment information/data. In example embodiments, the package/item/shipment information/data may comprise one or more of a consignee name/identifier, an package/item/shipment identifier, a service point (e.g., delivery location/address, pick-up location/address), instructions for delivering the package/item/shipment, an package/item/shipment delivery authorization code, information/data regarding if a mobile computing entity 120 is present at the service point, and/or the like. In this regard, in some example embodiments, a package/item/shipment may communicate send "to" address information/data, received "from" address information/data, unique identifier codes, and/or various other information/data. In one embodiment, each package/item/shipment may include a package/item/shipment identifier, such as an alphanumeric identifier. Such package/item/shipment identifiers may be represented as text, barcodes, tags, character strings, Aztec Codes, MaxiCodes, Data Matrices, Quick Response (QR) Codes, electronic representations, and/or the like. A unique package/item/shipment identifier (e.g., 123456789) may be used by the carrier to identify and track the package/item/shipment as it moves through the carrier's transportation network. Further, such package/item/shipment identifiers can be affixed to items/shipments by, for example, using a sticker (e.g., label) with the unique package/item/shipment identifier printed thereon (in human and/or machine readable form) or an RFID tag with the unique package/item/shipment identifier stored therein.

In various embodiments, the package/item/shipment information/data comprises identifying information/data corresponding to the package/item/shipment. The identifying information/data may comprise information/data identifying the unique package/item/shipment identifier associated with the package/item/shipment. Accordingly, upon providing the identifying information/data to the package/item/shipment detail database (may be embedded in distribution computing entity), the package/item/shipment detail database may query the stored package/item/shipment profiles to retrieve the package/item/shipment profile corresponding to the provided unique identifier.

Moreover, the package/item/shipment information/data may comprise shipping information/data for the package/item/shipment. For example, the shipping information/data may identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), whether a delivery confirmation signature is required, and/or the like. In certain embodiments, at least a portion of the shipping information/data may be utilized as identifying information/data to identify a package/item/shipment. For example, a destination location may be utilized to query the package/item/shipment detail database to retrieve data about the package/item/shipment.

In certain embodiments, the package/item/shipment information/data comprises characteristic information/data identifying package/item/shipment characteristics. For example, the characteristic information/data may identify dimensions of the package/item/shipment (e.g., length, width, height), a weight of the package/item/shipment, contents of the package/item/shipment, and/or the like. In certain embodiments, the contents of the package/item/shipment may comprise a precise listing of the contents of the package/item/shipment (e.g., three widgets) and/or the contents may identify whether the package/item/shipment contains any hazardous materials (e.g., the contents may indicate whether the package/item/shipment contains one or more of the following: no hazardous materials, toxic materials, flammable materials, pressurized materials, controlled substances, firearms, and/or the like).

4. Exemplary User Computing Entity

Mobile computing entities 120 may be configured for autonomous operation and/or for operation by a user (e.g., a vehicle operator, delivery personnel, customer, and/or the like). In certain embodiments, mobile computing entities 120 may be embodied as handheld computing entities, such as mobile phones, tablets, personal digital assistants, and/or the like, that may be operated at least in part based on user input received from a user via an input mechanism. Moreover, mobile computing entities 120 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, mobile computing entities 120 may be utilized as onboard controllers for UAVs configured for picking-up and/or delivering packages to various locations, and accordingly such mobile computing entities 120 may be configured to monitor various inputs (e.g., from various sensors) and generated various outputs (e.g., control instructions received by various vehicle drive mechanisms). It should be understood that various embodiments of the present disclosure may comprise a plurality of mobile computing entities 120 embodied in one or more forms (e.g., handheld mobile computing entities 120, vehicle-mounted mobile computing entities 120, and/or autonomous mobile computing entities 120).

Figure 3:
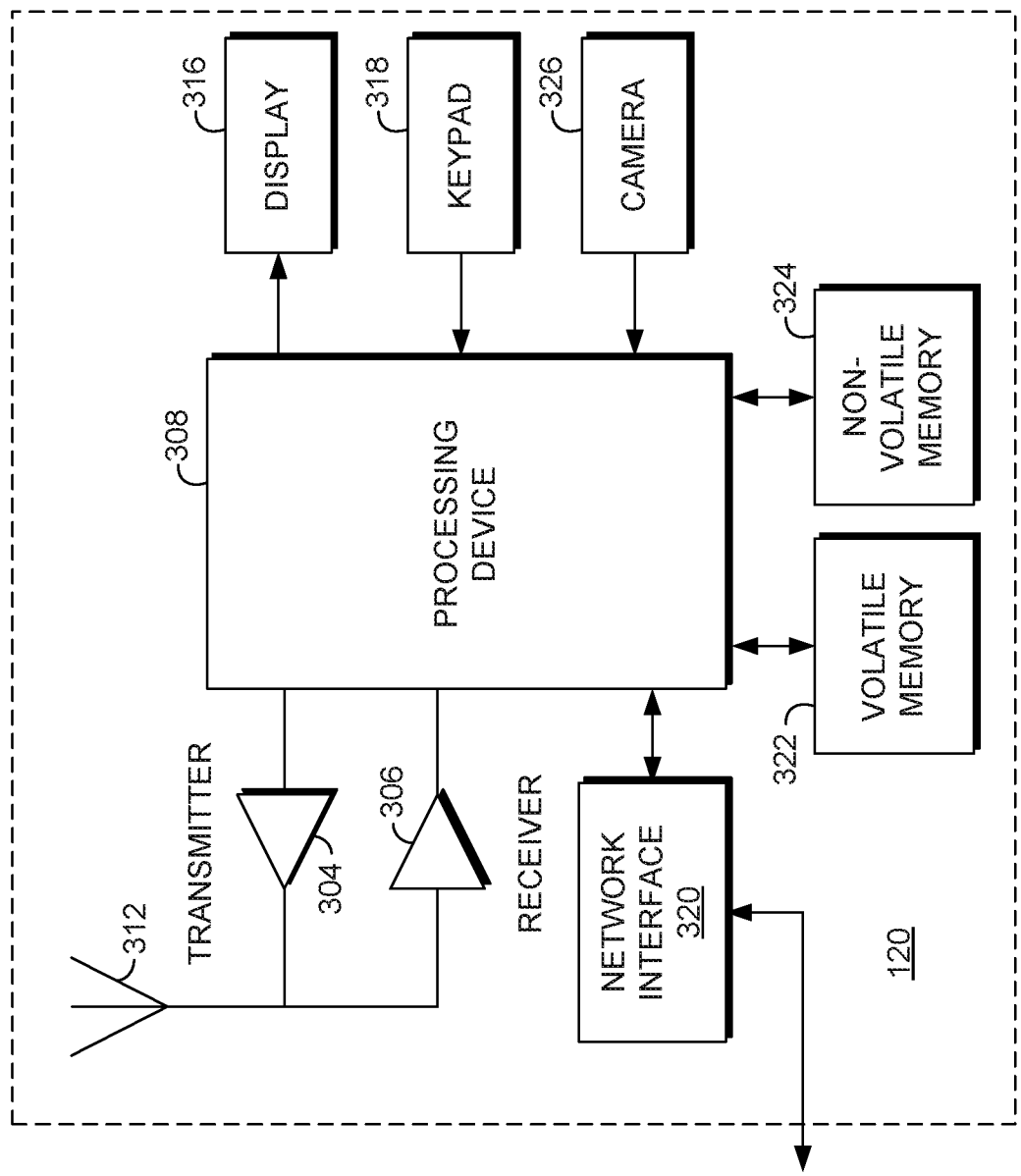

As will be recognized, a user may be an individual, a family, a company, an organization, an entity, a department within an organization, a representative of an organization and/or person, and/or the like—whether or not associated with a carrier. In one embodiment, a user may operate a mobile computing entity 120 that may include one or more components that are functionally similar to those of the shipper behavior predicting entities 100. FIG. 3 provides an illustrative schematic representative of a mobile computing entity 120 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Mobile computing entities 120 can be operated by various parties, including carrier personnel (sorters, loaders, delivery drivers, network administrators, and/or the like). As shown in FIG. 3, the mobile computing entity 120 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the mobile computing entity 120 may be capable of operating with one or more air interface standards, communication protocols, modulation types, and access types. More particularly, the mobile computing entity 120 may operate in accordance with any of a number of wireless communication standards and protocols, such as those described above with regard to the shipper behavior predicting entities 100. In a particular embodiment, the mobile computing entity 120 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile computing entity 120 may operate in accordance with multiple wired communication standards and protocols, such as those described above with regard to the shipper behavior predicting entities 100 via a network interface 320.

Via these communication standards and protocols, the mobile computing entity 120 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 120 can also download changes, add-ons, and updates, for instance, to its firmware, software (e.g., including executable instructions, applications, program modules), and operating system.

According to one embodiment, the mobile computing entity 120 may include location determining aspects, devices, modules, functionalities, and/or similar words used herein interchangeably. For example, the mobile computing entity 120 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the mobile computing entity's 120 position in connection with a variety of other systems, including cellular towers, Wi-Fi access points, and/or the like. Similarly, the mobile computing entity 120 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile computing entity 120 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the mobile computing entity 120 to interact with and/or cause display of information from the shipper behavior predicting entities 100, as described herein. The user input interface can comprise any of a number of devices or interfaces allowing the mobile computing entity 120 to receive information/data, such as a keypad 318 (hard or soft), a touch display, voice/speech or motion interfaces, or other input device. In some embodiments including a keypad 318, the keypad 318 can include (or cause display of) the conventional numeric (0-9) and related keys (#, *), and other keys used for operating the mobile computing entity 120 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the mobile computing entity 120 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The mobile computing entity 120 may be configured to capture images via the onboard camera 326, and to store those imaging devices/cameras locally, such as in the volatile memory 322 and/or non-volatile memory 324. As discussed herein, the mobile computing entity 120 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata associated with the image data that may be accessible to various computing entities.

The mobile computing entity 120 may include other input mechanisms, such as scanners (e.g., barcode scanners), microphones, accelerometers, RFID readers, and/or the like configured to capture and store various information types for the mobile computing entity 120. For example, a scanner may be used to capture package/item/shipment information/data from an item indicator disposed on a surface of a shipment or other item. In certain embodiments, the mobile computing entity 120 may be configured to associate any captured input information/data, for example, via the onboard processing element 308. For example, scan data captured via a scanner may be associated with image data captured via the camera 326 such that the scan data is provided as contextual data associated with the image data.

The mobile computing entity 120 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the mobile computing entity 120. As indicated, this may include a user application that is resident on the entity or accessible through a browser or other user interface for communicating with the shipper behavior predicting entities 100 and/or various other computing entities.

In another embodiment, the mobile computing entity 120 may include one or more components or functionality that are the same or similar to those of the shipper behavior predicting entities 100, as described in greater detail above. As will be recognized, these architectures and descriptions are provided for exemplary purposes only and are not limiting to the various embodiments.

5. Exemplary Package/Item/Shipment Information

As noted herein, various shipments/items may have an associated package/item/shipment profile, record, and/or similar words used herein interchangeably stored in a package/item/shipment detail database. The package/item/shipment profile may be utilized by the carrier to track the current location of the package/item/shipment and to store and retrieve information/data about the package/item/shipment. For example, the package/item/shipment profile may comprise electronic data corresponding to the associated package/item/shipment, and may identify various shipping instructions for the package/item/shipment, various characteristics of the package/item/shipment, and/or the like. The electronic data may be in a format readable by various computing entities, such as a shipper behavior predicting entities 100, a mobile computing entity 110, an autonomous vehicle control system, and/or the like. However, it should be understood that a computing entity configured for selectively retrieving electronic data within various package/item/shipment profiles may comprise a format conversion aspect configured to reformat requested data to be readable by a requesting computing entity.

In various embodiments, the package/item/shipment profile comprises identifying information/data corresponding to the package/item/shipment. The identifying information/data may comprise information/data identifying the unique package/item/shipment identifier associated with the package/item/shipment. Accordingly, upon providing the identifying information/data to the package/item/shipment detail database, the package/item/shipment detail database may query the stored package/item/shipment profiles to retrieve the package/item/shipment profile corresponding to the provided unique identifier.

Moreover, the package/item/shipment profiles may comprise shipping information/data for the package/item/shipment. For example, the shipping information/data may identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), whether a delivery confirmation signature is required, and/or the like. In certain embodiments, at least a portion of the shipping information/data may be utilized as identifying information/data to identify a package/item/shipment. For example, a destination location may be utilized to query the package/item/shipment detail database to retrieve data about the package/item/shipment.

In certain embodiments, the package/item/shipment profile comprises characteristic information/data identifying package/item/shipment characteristics. For example, the characteristic information/data may identify dimensions of the package/item/shipment (e.g., length, width, height), a weight of the package/item/shipment, contents of the package/item/shipment, and/or the like. In certain embodiments, the contents of the package/item/shipment may comprise a precise listing of the contents of the package/item/shipment (e.g., three widgets) and/or the contents may identify whether the package/item/shipment contains any hazardous materials (e.g., the contents may indicate whether the package/item/shipment contains one or more of the following: no hazardous materials, toxic materials, flammable materials, pressurized materials, controlled substances, firearms, and/or the like).

VI. EXAMPLE SYSTEM OPERATION

Figure 4:
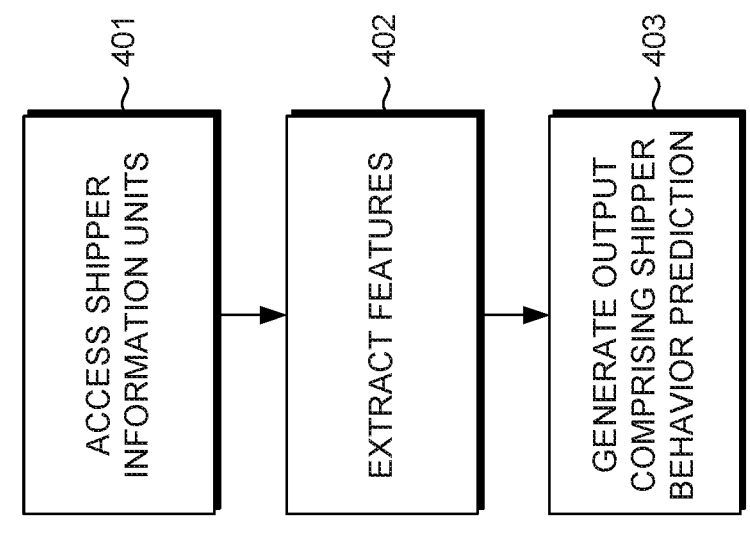
FIG. 4 illustrates an exemplary process for use with embodiments of the present disclosure.
Figure 5:
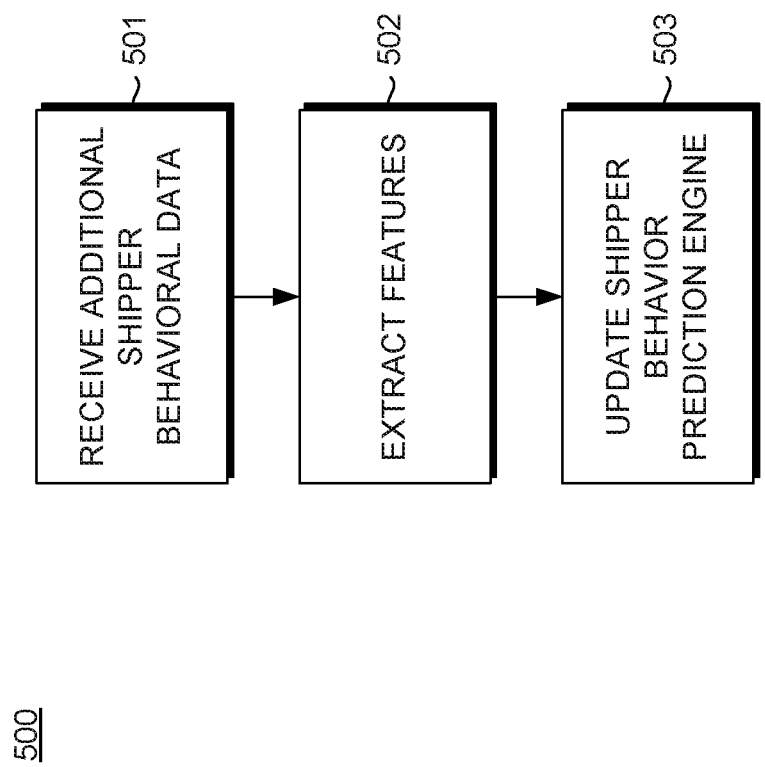
FIG. 5 illustrates an exemplary process for use with embodiments of the present disclosure.
Figure 6:
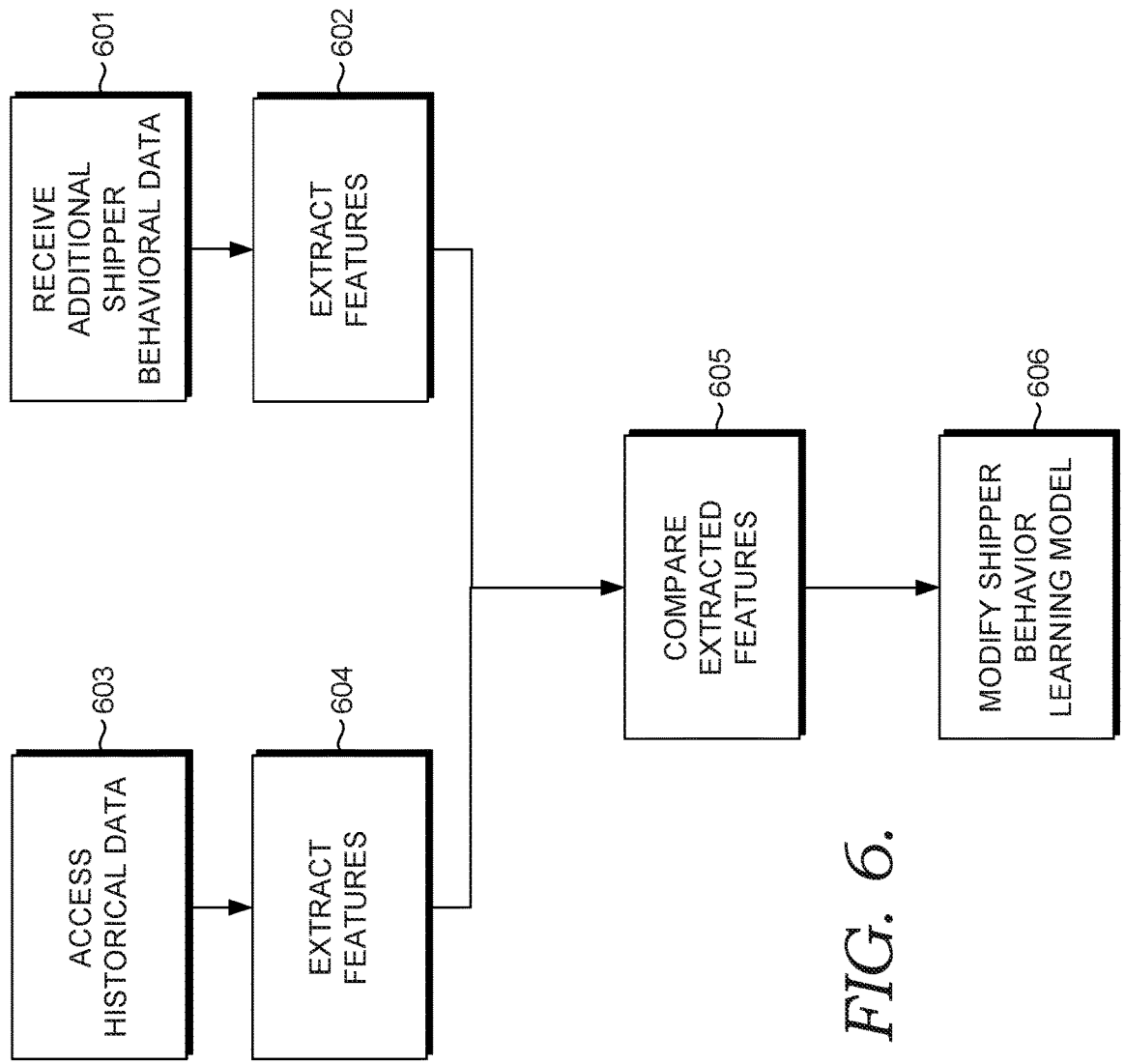
FIG. 6 illustrates an exemplary process for use with embodiments of the present disclosure.

FIG. 4-6 illustrates a flow diagram of an example system in accordance with some embodiments discussed herein. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

FIG. 4 illustrates a flowchart that contain operations for using a shipper behavior predicting entity 100 to autonomously and automatically predict shipper behavior. The operations illustrated in FIG. 4 may, for example, be performed by an apparatus 300 as described above. And in this regard, the apparatus 100 may perform these operations through the use of one or more of processing element 305, non-volatile memory 310, and volatile memory 315. It will be understood that the shipper behavior predicting engine comprises a set of hardware components or hardware components coupled with software components configured to autonomously or automatically predict shipper behavior. These components may, for instance, utilize the processing element 305 to execute operations, and may utilize non-volatile memory 310 to store computer code executed by the processing element 305, as well as to store relevant intermediate or ultimate results produced from execution of the shipper behavior prediction engine. It should also be appreciated that, in some embodiments, the shipper behavior prediction engine may include a separate processor, specially configured field programmable gate array (FPGA), or application specific interface circuit (ASIC) to perform its corresponding functions. In addition, computer program instructions and/or other type of code may be loaded onto a computer, processor or other programmable apparatus's circuitry to produce a machine, such that the computer, processor other programmable circuitry that execute the code on the machine create the means for implementing the various functions described in connection with the shipper behavior prediction engine.

At block 401, the shipper behavior prediction engine accesses one or more shipper information units from a shipper behavioral data management tool, wherein the one or more shipper information units comprise shipper behavioral data associated with a shipper (e.g., historical actual shipping dates and package manifest dates of the same shipper), wherein the shipper behavioral data comprises one or more of: package received time, manifest package time, and package information. In some embodiments, the shipper behavioral data comprises package received time, manifest package time, package information such as tracking number, package activity time stamp, package dimension including the height, length and width of the package, package weight, package manifested weight, package manifest time stamp, package service type, package scanned time stamp, package tracking number, package sort type code, package scanned code, unit load device type code, account number associated with the package, and the like. In some embodiments, shipper behavioral data may be received from vehicles or mobile computing entities.

In some embodiments, accessing the shipper information units at block 401 is associated with one or more rules in order for the process 400 to automate. For example, a first rule may be, if one or more users (e.g., the first 50 users) or other entity provides one or more package manifests (e.g., a batch of 100 package manifests), provides shipping transaction data (e.g., data from one or more labels printed for a user at a shipping store), and/or any shipping data, the system automatically accesses shipper information units at block 401, automatically extracts features at block 402, and automatically generates output at block 403 for the data provided by the user or other entity. In this way, particular embodiments improve existing technology by automating functionality that was previously performed via manual computing system entry, such a user generating its own prediction value or entering a value based on personal observation or manually inputting spreadsheet values for prediction. In an example illustration of particular embodiments, a rule may be that the process 400 will automatically occur only after X time period (e.g., 20 days) for all data received (e.g., 100 package manifests). In this way automation can be batched or chunked to reduce I/O cycles.

At block 402, the shipper behavior prediction engine extracts one or more features (e.g., actual package receive times and associated package manifest projected receive times) from the one or more shipper information units, wherein the one or more features are representative of one or more of a package received time, a manifest package time, or package information. In some embodiments, features are not necessarily extracted according to block 402. Rather, block 403 can immediately follow block 401 in particular embodiments. In some embodiments, the shipper behavior prediction engine also purposefully excludes other features from further analysis (e.g., address information, telephone number, package size, etc.) in parallel with the extracting in block 402. In some embodiments, the features are generated by directly copying shipper information units. Alternatively or in addition, the features can be generated from other techniques. For example, if a shipper information unit comprises "manifest time: 9:00 am; received time: 10:04 am; package weight: 30 lb", the features generated can be based on separating each of the constituent elements present in the shipper information unit, and in this case, the first feature may be "manifest time: morning", the second feature may be "received time: morning", and the third feature may be "package weight: heavy". In some embodiments, one feature may be generated based on multiple shipper information units. For example, package received time for multiple occasions can be used to generate one feature. A shipper behavior prediction engine may use shipper information units that represent package manifest time and package received time in the past two months and generate a feature called "percentage of early manifests in the past two months".

At block 403, the shipper behavior prediction engine generates an output comprising a shipper behavior prediction for the shipper based on running the extracted features through a shipper behavior learning model. For example, the shipper behavior learning model can take the form of a random-forest based learning model, a gradient boosting based learning model, and the like in order to provide a probability that a shipper associated with the history of package manifests is a late shipper, an early shipper, and/or a timely shipper, which may help a sorting facility, for example, plan better for predicted workloads (e.g., increase staff in response to predicted received times).

In some embodiments, the learning models can be implemented using programming languages such as R, Java, Python, Scala, C, Weka or C++, although other languages may be used in addition or in the alternative. Similarly, the learning models can be implemented using existing software modules and framework such as Apache Spark, Apache Hadoop, Apache Storm, or Apache Flink, although other frameworks may be used in addition or in the alternative. Additionally or alternatively, the shipper behavior learning model is capable of running on a cloud architecture, for example, on cloud architectures based on existing frameworks such as a Hadoop Distributed File System (HDFS) of a Hadoop cluster. In some embodiments, the cloud architectures are memory based architectures where RAM can be used as long term storage to store data for faster performance and better scalability compared to other types of long term storage, such as a hard disk.

In some embodiments, a random-forest based learning model may be used, which operates by constructing a multitude of decision trees, evaluating the features by using the decision trees, and sampling a set of data from features as a training set. The decision trees starts with a root node representing a parameter, for example, "frequency of shipping >5 in the past three months or not". The decision tree can continue to grow with additional parameters. For example, under each decision tree, the decision tree will grow or be traversed based on additional nodes within the decision tree with additional parameters such as "percentage of late manifests in the past month >50% or not" and "percentage of late manifests in the past months >50% or not" wherein the percentage of late manifests are calculated by comparing the package manifest time and package received time. Each node with a parameter or test would represent a binary split or Boolean value where the features could be labeled as or associated with "Yes" (i.e., TRUE) or "No" (i.e. FALSE) for the particular node with the parameter or test. If input for a node is not selected from the results of any other node, then the node is defined as the top layer. If a node is selected from the results produced from an operation performed at a different node, the two nodes are in two different layers. In each layer, there might be a number of different nodes. In some embodiments, the parameters or tests used in nodes are randomly selected from a set of pre-defined parameters. The pre-defined parameters may be manually inputted into the shipper behavior prediction engine. In some embodiments, the features fed into one decision tree are a set of features that are associated with one shipper. In some embodiments, if the frequency of shipping exceeds a pre-defined threshold and the percentage of late manifests during a pre-defined time period exceeds another pre-defined threshold, the shipper associated with this late manifest will be preliminarily categorized as a "late shipper". At each node of the decision tree, preliminary categorization may be generated. Note that this preliminary categorization is a categorization used within in the learning model and may not be equivalent to the final output of the model.

In some embodiments, the preliminary results from each node of decision tree will be assigned a weight. The weight reflects how important that particular preliminary results is for the learning model. The decision tree can grow deeper indefinitely by incorporating additional nodes with parameters that relates to the features extracted from shipper information units. For example, in one embodiment, the decision tree has four layers (in another words, the decision tree has a depth of four). The parameters used in the decision tree may be based on any feature extracted from the shipper information units. For example, a decision tree can use parameters that comprises height, length and width, package weight, package manifested weight, package manifest time, package service type, package scanned time stamp, package tracking number, package sort type code, package scanned code, unit load device type code, account number associated with the package, and the like.

Various classification models can be used to generate parameters of the learning models by automatically correlating features to one another, for example, logistic regression based models, naïve Bayes based models, support vector machines based models, quadratic classifiers, kernel estimation based models, boosting based models, decision tree based models, and neural networks based models. In some embodiments, 16 to 25 different types of features are selected as preliminary parameters. The features may be assigned or labeled by a weight value based on importance. Accuracy of preliminary results can be generated for the different preliminary parameters. Importance may be identified based on elbow method (comparing percentage of variance as a function of the number of parameters) or calculating Area Under the Receiving Operating Characteristic Curve (AUC). A number of parameters may be selected for use by a random forest based model or other classification models. In some embodiments, less than 16 or more than 25 types of features may be selected as preliminary parameters.

In some embodiments, the final result of a particular decision tree (note that this final result for the particular decision tree may or may not be the final output of the learning model as a whole) could be generated based on the preliminary result from each layer; the method for generating the final result may take the form of majority vote or weighted majority vote between the preliminary results. The output for a particular iteration the random forest based learning model (note: not necessarily the final output of random forest based learning model) may be obtained by majority vote or weighted majority vote between the results from different decision trees.

In some embodiments, the random forest based learning model may evaluate the preliminary categorizations with the training set. The data in the training set may be categorized using the same categories as the preliminary categorization by another learning model or may be categorized manually. Then the preliminary categorization is compared to the preliminary categorization obtained by running the decision trees. The parameters of the learning model are thereafter adjusted based on this comparison. For example, the "percentage of late manifests in the past 1 month >50% or not" may be adjusted to "percentage of late manifests in the past 1 month >40% or not", and the like. Further, the weight of each node of decision trees may be adjusted. In some embodiments, the nodes and the parameters associated with the nodes can be adjusted or deleted as well.

After completion of a defined number of rounds of analyzing features using decision trees and/or adjusting the learning model with training set, the random forest based learning model may output a shipper behavior prediction based on the outputs from the decision trees. In some embodiments, the shipper behavior prediction is equivalent to the latest version of output for a particular iteration of the random forest based learning model.

In some embodiments, a gradient boosting based learning model may alternatively be used. A gradient boosting based learning model also constructs decision trees and utilizes decision trees in a similar fashion to a random forest based learning model. In some embodiments, the gradient boosting based learning models uses training set similar to how the training sets are used in random forest based learning models. In some embodiments, the training sets comprises additional samples selected based on the weights assigned to the parameters. In some embodiments, the gradient boosting based learning model comprises the following parameters: a number of shipper classes, a maximum depth of a tree, a learning rate, one or more probability estimates of the output, a logarithmic loss, and a number of rounds during which to apply a base learning algorithm (one iteration of a multitude of decision trees).

In some embodiments, the shipper behavior prediction provided by the model comprises one or more of: probability scores associated with classifications of shippers such as early shipper, timely shipper and late shipper for each shipper associated with set of features, average time difference between received time and manifest time, account information associated with the shipper, time stamp data of indicating when prediction is generated, building type associated with the prediction, predicted manifest and package received time at each sort, predicted of manifest and package received time at different defined time frames such as day of the week, month of the year and the like, identifiers of buildings, probability score for building types, classifications or average package weight, indicators indicating correlation between any of the shipper behavioral data in the form of probability scores, predicted averages and/or classifications, and the like.

FIG. 5 illustrates a flowchart that contain operations for updating the shipper behavior prediction engine embedded in shipper behavior entity 100. The operations illustrated in FIG. 5 may, for example, be performed by an apparatus 300 as described above. And in this regard, the apparatus 100 may perform these operations through the use of one or more of processing element 305, non-volatile memory 310, and volatile memory 315. In various embodiments, FIG. 5 corresponds to updating the learning model and prediction made at block 403 of FIG. 4.

At block 501, the shipper behavior prediction engine receives additional shipper behavioral data (e.g., additional package manifest data) after a particular future time period. In some embodiments, the particular future time period reflects the time period when additional packages are received from shippers associated with the features used in operations reflected in FIG. 4. For example, if the features previously used to generate predictions are associated with shippers A, B, C . . . ; the particular future time period may be configured as time period where additional shipper behavioral data is received for the majority of the shipper A, B, C, etc. At block 502, the shipper behavior prediction engine extracts one or more features from the additional shipper behavioral data. At block 503, the shipper behavior prediction engine updates the shipper behavior prediction engine based on the features extracted from additional shipper behavioral data. For example, a shipper may have changed his/her shipping habits from historically shipping late (e.g., as indicated in FIG. 4) to now shipping early. Accordingly, the shipper behavior prediction engine may now predict that the shipper will ship early because of this recent trend. In some embodiments, the shipper behavior prediction engine updates itself by changing the decision tree parameters or tests associated with the shipper behavior learning model. For example, instead of a test that asks whether a user has shipped late in the last X months, the X can be changed to a different value to reflect the user's sudden change within the last particular set of months.

FIG. 6 illustrates another flowchart that contain operations for updating the shipper behavior prediction engine embedded in the shipper behavior entity 100. The operations illustrated in FIG. 6 may, for example, be performed by an apparatus 300 as described above. And in this regard, the apparatus 100 may perform these operations through the use of one or more of processing element 305, non-volatile memory 310, and volatile memory 315.

At block 601, the shipper behavior prediction engine receives additional shipper behavioral data after a particular time period (e.g., after a time period of the prediction of block 403 and/or 503 of FIGS. 4 and 5 respectively). At block 602, the shipper behavior prediction engine extracts one or more features from the additional shipper behavioral data. At block 603, the shipper behavior prediction engine accesses historical data to generate a historical data set for one or more historical shipper behavior prediction. At block 604, the shipper behavior prediction engine extracts one or more features from the historical data set. As illustrated, block 601 to 602 can happen before, after or concurrently with block 603 to 604. At block 605, the shipper behavior prediction engine compares the features extracted from the additional shipper behavioral data with the features extracted from the historical data set. At block 606, the shipper behavior prediction engine modifies the shipper behavior learning model stored in the shipper behavior prediction engine based on the difference between the one or more features extracted from the additional shipper behavioral data and the one or more features extracted from the historical data set. In some embodiments, the shipper behavior prediction modifies the shipper behavior learning model by reading inputs from an operator or a learning model analyzing the difference between the one or more features extracted from the additional shipper behavioral data and the one or more features extracted from the historical data set.

Figure 7:
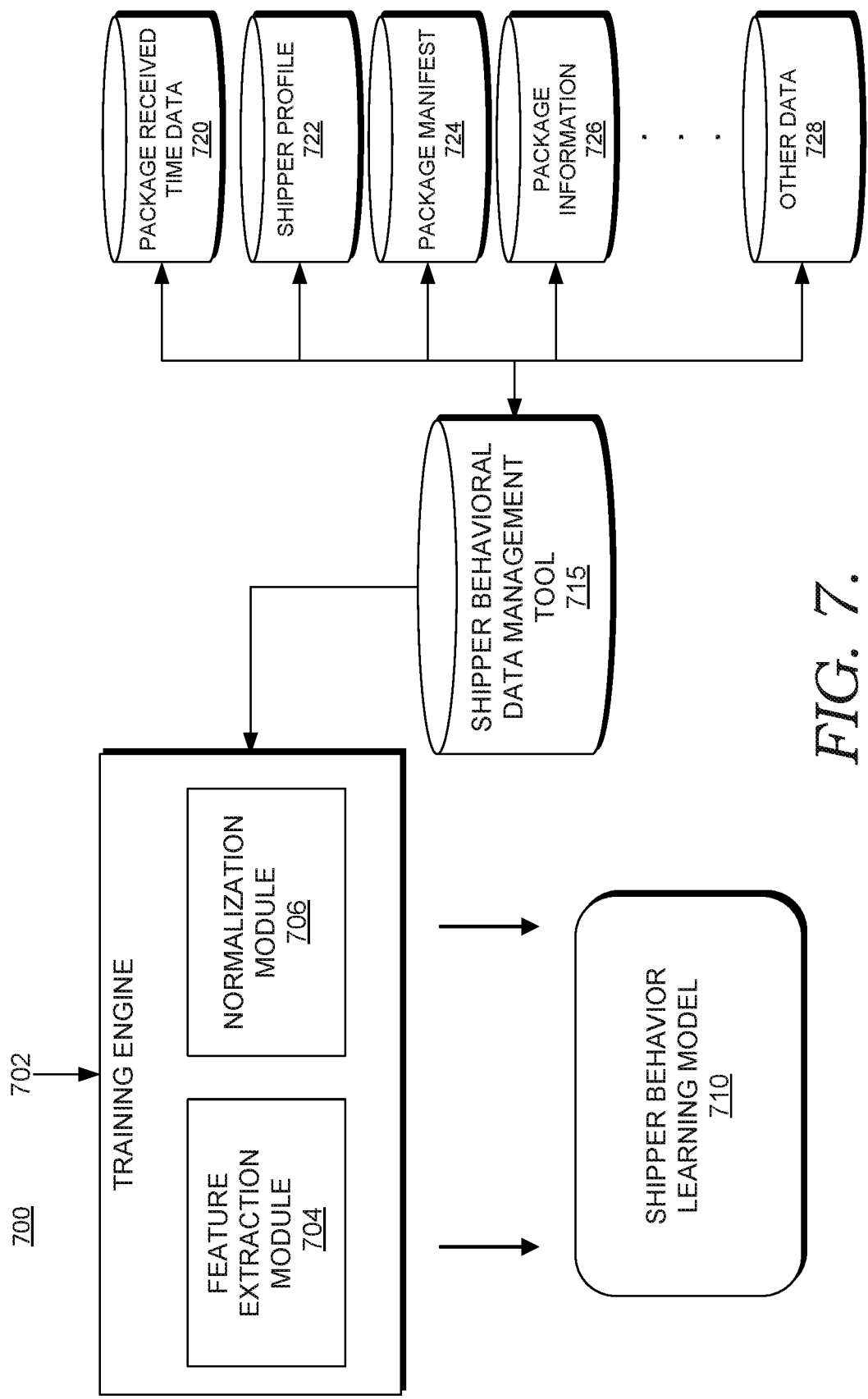
FIG. 7 is an example block diagram of example components of an example shipper behavior learning model training environment.

FIG. 7 is an example block diagram of example components of an example shipper behavior learning model training environment 700 that is used to train the shipper behavior learning model that is relied upon by the shipper behavior predicting entity 100 to update shipper learning model in some example embodiments. The depicted shipper behavior learning model training environment 700 comprises a training engine 702, shipper behavior learning model 710, and a shipper behavioral data management tool 715.

In some examples, the shipper behavioral data management tool 715 comprises a variety of shipper behavioral data. In some examples, the historical data may be obtained and/or stored after shipper behavior predicting entity 100 receives package received time data. For example, the shipper behavioral data management tool 715 may comprise historical package received time data 720, shipper profile 722, package manifest 724, package information 726, and/or other data 728.

In some embodiments, the shipper behavioral data comprises actual package received time (e.g., when a package was actually received from a shipper), manifest package time (e.g., when the shipper indicated that he/she would ship the package), package information such as tracking number, package activity time stamp, package dimension including the height, length and width of the package, package weight, package manifested weight, package manifest time stamp, package service type, package scanned time stamp, package tracking number, package sort type code, package scanned code, unit load device type code, account number associated with the package, and the like. In some embodiments, shipper behavioral data may be received from vehicles or mobile computing entities.

In some examples, the training engine 702 comprises a normalization module 706 and a feature extraction module 704. The normalization module 706, in some examples, may be configured to normalize the historical data so as to enable different data sets to be compared. In some examples, the feature extraction module 704 is configured to parse the shipper behavioral data into shipper information units relevant to modeling of the data, and non-shipper information units that are not utilized by the shipper behavior learning model 710, and then to normalize each distinct shipper information units using different metrics. For example, the shipper information units can be labeled or categorized based on package received time, package manifest time, package dimension, package weight, frequency of shipping from the particular shipper associated with the package, building type, account type, sort type, other package information from scanners, other package information from package manifest, other package information from mobile computing entities, and the like. For the purpose of categorizing the shipper information units, said information used to label or categorize shipper information units may be processed (such as labeled, categorized and parsed) first.

Alternatively or additionally, the normalization module 706 may be usable with respect to processing shipper behavioral data in the shipper behavioral data management tool 715, such as to normalize the shipper behavioral data before the shipper behavioral data is labeled or otherwise characterized by feature extraction module 704. For example, repetitive shipper behavioral data corresponding to the same instance received from multiple sources may be deduplicated.

Finally, the shipper behavior learning model 710 may be trained to extract one or more features from the historical data using pattern recognition, based on unsupervised learning, supervised learning, semi-supervised learning, reinforcement learning, association rules learning, Bayesian learning, solving for probabilistic graphical models, k-means based clustering, exponential smoothing, random forest model based learning, or gradient boosting model based learning, among other computational intelligence algorithms that may use an interactive process to extract features from shipper behavioral data. In some embodiments, the shipper behavior learning model is a random forest based learning model that has parameters comprising one or more of a maximum depth or a defined number of trees. In some embodiments, the shipper behavior learning model is a gradient boosting based learning model that comprises at least the following parameters: a number of shipper classes, a maximum depth of a tree, a learning rate, probability estimates of the output, logarithmic loss, and a number of rounds during which to apply a base learning algorithm. The probability estimates of the output may comprise confidence intervals, error estimates, and the like. The logarithmic loss measures the performance of the classification model.

Figure 8:
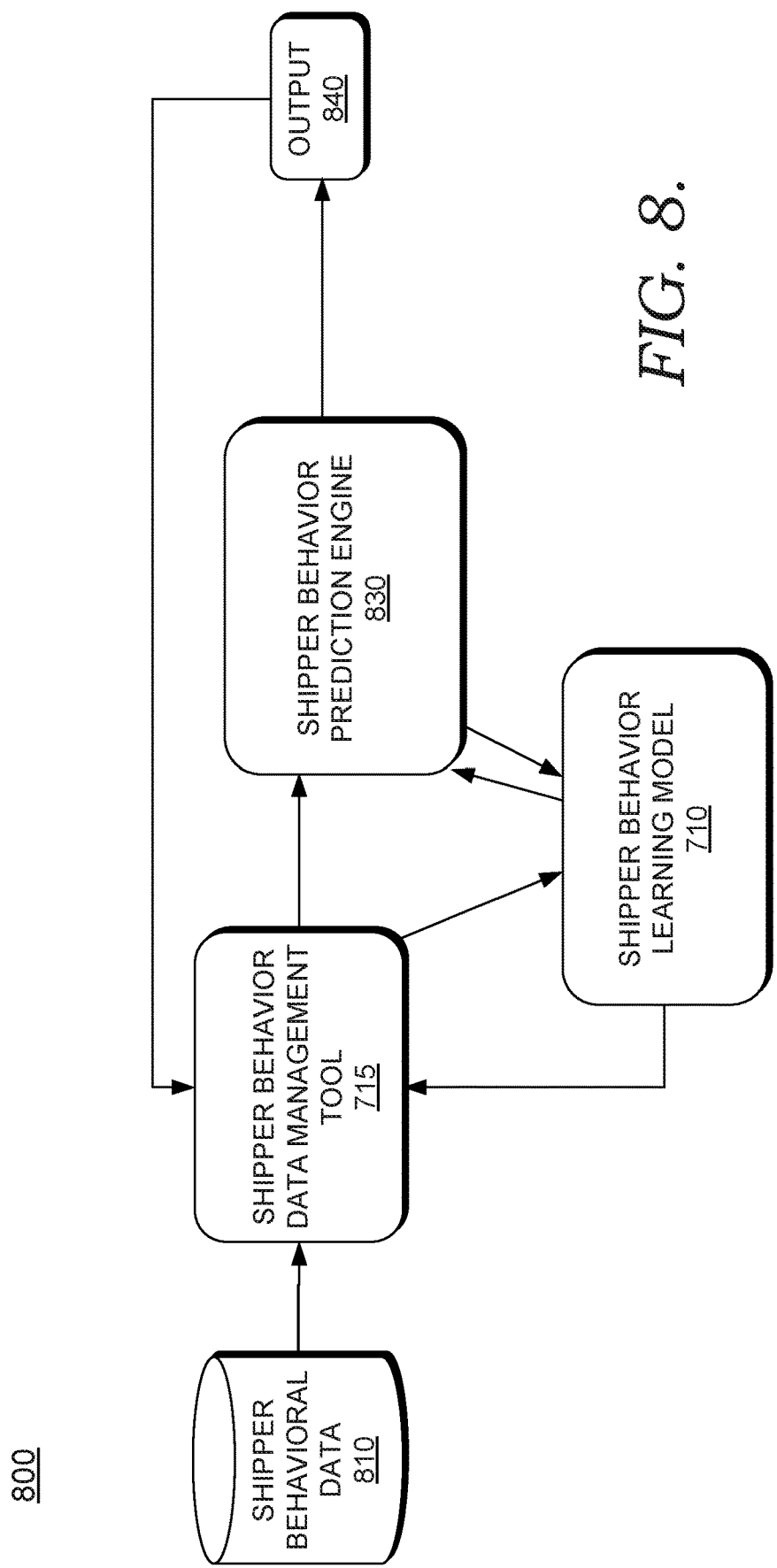
FIG. 8 is an example block diagram of example components of an example shipper behavior learning model service environment.

FIG. 8 is an example block diagram of example components of an example shipper behavior learning model service environment 800. In some example embodiments, the example shipper behavior learning model service environment 800 comprises shipper behavioral data 810, a shipper behavior prediction engine 830, output 840, the shipper behavioral data management tool 715 and/or the shipper behavior learning model 710. The shipper behavioral data management tool 715, a shipper behavior prediction engine 830, and output 840 may take the form of, for example, a code module, a component, circuitry and/or the like. The components of the shipper behavior learning model service environment 800 are configured to provide various logic (e.g. code, instructions, functions, routines and/or the like) and/or services related to the shipper behavior learning model service environment.

In some examples, the shipper behavioral data 810 comprises historical package received time data, shipper profile, package manifest, package information, and/or other data. In some examples, the shipper behavioral data management tool 715 may be configured to normalize the raw input data, such that the data can be analyzed by the shipper behavior prediction engine 830. In some examples the shipper behavioral data management tool 715 is configured to parse the input data interaction to generate one or more shipper information units. Alternatively or additionally, the shipper behavior prediction engine 830 may be configured to extract one or more features from the one or more shipper information units. In some embodiments, the features are generated by directly copying shipper information units. Alternatively or in addition, the features can be generated using other techniques. For example, if the shipper information unit comprises "manifest time: 9:00 am; received time: 10:04 am; package weight: 30 lb", the features generated can be based on categorization of each of the elements present in the shipper information units in the form of "manifest time: morning; received time: morning; package weight: heavy". In some embodiments, one feature may be generated based on multiple shipper information units. For example, package received time for multiple occasions can be used to generate one feature. A shipper behavior prediction engine may use shipper information units that represents package manifest time and package received time in the past two months and generate a feature called "percentage of early manifests in the past two months".

In some examples, shipper behavioral data management tool 715 and shipper behavior prediction engine 830 are configured to receive a shipper behavior learning model, wherein the shipper behavior learning model was derived using a historical shipper behavioral data set. Alternatively or additionally, the shipper behavior prediction engine 830 may be configured to generate generating an output 840 based on the shipper behavior learning model and the one or more features. In some embodiments, the output 840 comprises a shipper behavior prediction for the shipper. Alternatively or additionally, the output 840 comprises shipper behavior prediction for the shipper which comprises at least one probability score for the shipper, each probability score comprising a probability that the shipper comprises a member of a corresponding shipper class. In some embodiments, classification of a particular shipper as a member of the different shipper classes is based on an expected time difference between a package received time for the particular shipper and manifest package time for the particular shipper. In some embodiments, the output 840 may further comprise probability of package timeliness at sort.

Without shipper behavior predicting capabilities, a carrier would not be able to efficiently allocate resources with regard to package delivery. Such resources may comprise human resources and transportation resources such as vehicles. The creation of package manifests (reports received from shipper before they send packages to a carrier) comprises a nascent solution to this problem. However, package manifests are subject to human error and, in reality, a shipper may not behave exactly in accordance with a package manifest. For example, the shipper's actual shipping time may be vastly different than the time indicated in the package manifest. Accordingly, there is a latent need for tools that improve the accuracy of shipper behavior prediction.

By providing shipper behavior prediction using shipper behavior predicting entity 100 to a computing entity configured to determine resource allocations, resources can be better allocated when package manifests are received. For example, if received package manifests indicate that there are a lot of packages with manifest time after four hours in certain locations, without shipper behavior prediction entity 100, computing entities responsible for resource allocation would be assigning additional resources based on package those manifest times. However, the package manifest times are subject to human error and the additional resources allocated may not all be needed in this scenario if the shippers are generally late in sending their packages to the carrier, causing a waste of resources. Similarly, if the shippers are generally early, then failure to adequately outfit a carrier facility can cause understaffing problems when the shippers send the packages early and the additional resources are not available yet. By autonomously and automatically predicting the behavior of various shippers using shipper behavior predicting entity 100, a computing entity configured to determine resource allocations can reduce issues caused by human error and mitigate potential resource misallocation.

Further, by utilizing shipper behavior prediction entity 100, a computing entity configured to provide cost estimation associated with each package will be able to provide more accurate cost estimation. In turn, the pricing associated with each package from each shipper can be adjusted based on the more accurate cost estimation. For instance, when a shipper is typically early or late, a penalty surcharge may be applied to incentivize timelier package delivery by the shipper and to pay for possible resource allocation problems caused by the early and/or late package deliveries. More accurate cost estimation enables more accurate internal evaluation and resource allocation within service facilities.

VII. EXAMPLE SYSTEM LEARNING MODELS

Figure 9:
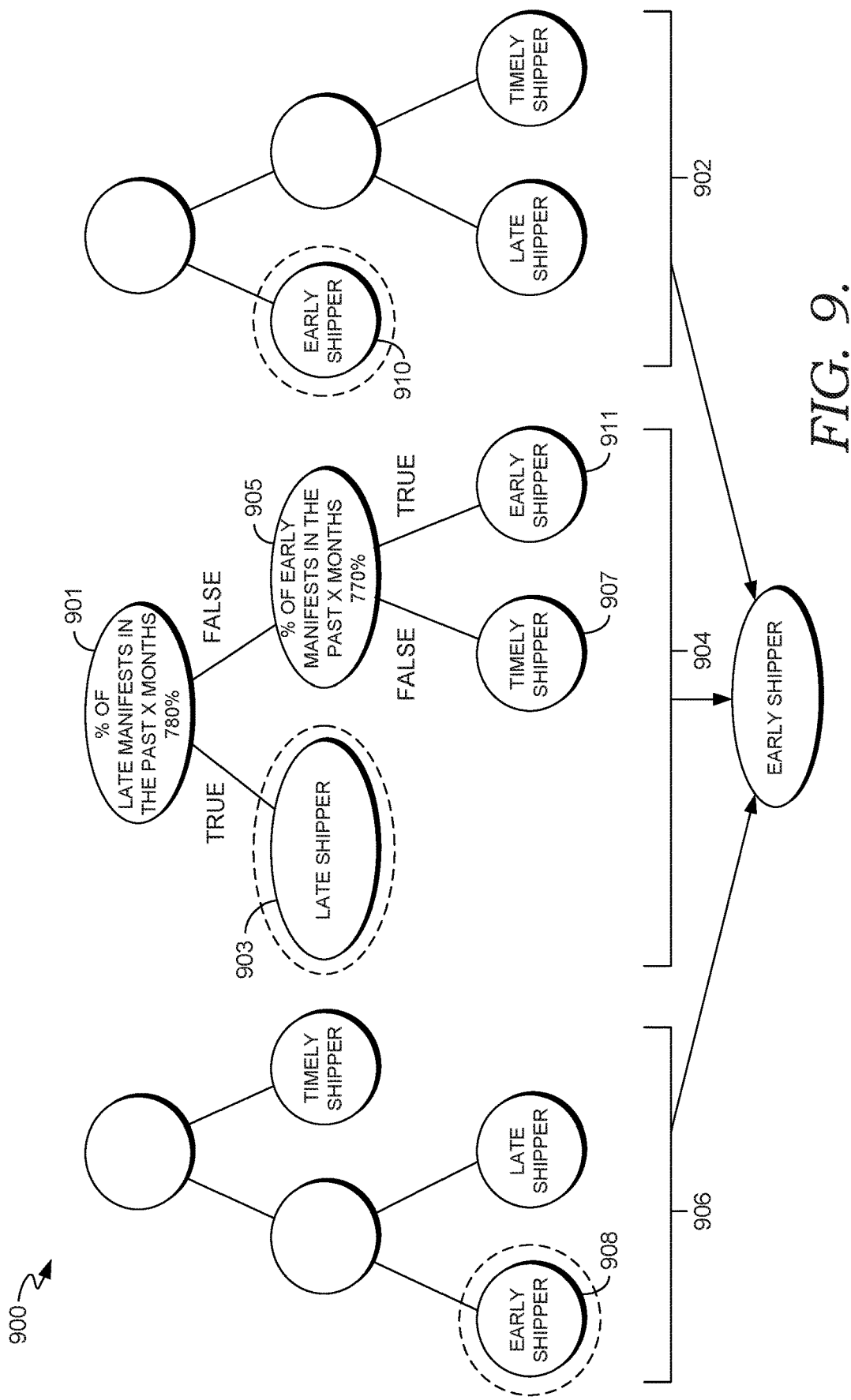
FIG. 9 illustrates an example random forest learning model, in which aspects of the present disclosure are employed in, according to particular embodiments.

FIG. 9 illustrates an example random forest learning model 900, according to particular embodiments. Although FIG. 9 (and FIGS. 10-11) illustrates a specific random forest learning model, values with specific decision tree pathways, parameters, and tests, it is understood that any suitable value, node, test, and/or decision pathway may exist. It is also understood that although there is represented a specific quantity of decision trees with a particular quantity of nodes, there may be any suitable quantity of decision trees and corresponding nodes in the learning model. In various embodiments, FIGS. 9-11 represent the shipper behavior learning model 710 of FIGS. 7 and 8 and/or used to make the predictions as described in FIGS. 4-6.

A random forest learning model includes various decision trees that each present random and unique decision pathway tests to arrive at the same set of results. More particularly, each decision tree within a random forest has at least one different root or branch nodes and tests but the same leaf node answers. Each decision tree is analyzed to determine which leaf node was traversed, as only one leaf node is traversed in particular embodiments. The leaf node with the highest quantity of traversals within the forest determines the output prediction (i.e., majority vote wins). Each root node or branch node includes a "test" corresponding to a question that determines whether a TRUE or FALSE pathway is traversed. For example, referring to the root node 901, the test or question is whether the percentage of manifests in the past X months (e.g., 6 months) has been greater than or equal than 80%. If yes or TRUE, then there is traversal to the node 903, if no or FALSE there is a traversal to node 905 for further processing. Accordingly, the traversal of each decision tree starts at the root node, down through the branch nodes, until one of the leaf nodes are reached. The specific leaf nodes that are reached depends on the given tests within the root and branch nodes. In various embodiments, each of these tests represent "rules" as described above that improve existing technologies in order to automatically predict shipping behavior.

The learning model 900 includes decision tees 906, 904, and 902. Each decision tree has the same leaf node answers or values of "early shipper," "late shipper," and "timely shipper." For example, the decision tree 904 includes the leaf nodes 903, 907, and 911, which represent "late shipper,"

"timely shipper," and "early shipper." Identical leaf nodes are also indicated in the other decision tees 906 and 902. The learning model 900 is used to generate a prediction of whether a particular shipment will be received (e.g., by a sorting facility) at a "late" time, at a "timely" time," or at an "early" time. Accordingly, the classifications of "late shipper," "timely shipper," and "early shipper" are generated to reflect this prediction. In an example illustration, if a shipper is classified as an "early shipper," it can be predicted that a sorting facility will receive the shipper's shipped item earlier that some defined criteria, such as earlier than the stated package manifest time.

An example illustration of how each decision tree works is indicated by decision tree 904. A particular first shipper (or set of shippers) may have a history of shipping parcels and thus may have generated various package manifests and the system may have recorded when the shipper actually shipped packages. Accordingly, the system may compute and store the percentage of early/late manifests that the first shipper has been a part of for the past X months. In this manner, the actual shipment time can be compared to the package manifest information to determine if the shipper has historically been early, timely, and/or late. For example, a user may have brought a parcel to a carrier store for shipment later than the stated package manifest time 80% of the time over the past 24 months. The root node 901 is used for deciding whether a shipper has generated late manifests greater than or equal to 80% of the time during the last X months. If the particular shipper has made shipments that were late greater than or equal to 80% of the time, then the "TRUE" pathway is traversed (e.g., a Boolean value is set to TRUE) and the system automatically classifies (e.g., indicates a high probability that) the shipper as a late shipper (branch node 903), meaning that the shipper will likely make his/her next shipment later than some criteria, such as indicated in a package manifest. However, if the particular shipper has made shipments that were late 79% of the time or less, then the FALSE pathway is traversed, whereby another decision at node 905 is made to determine if the particular shipper is a timely shipper or early shipper based on another test. If the percentage of early manifests in the past X months was not greater or equal to 70% (e.g., the user provided a shipment to a shipping facility earlier than the indicated package manifest only 60% of the time), then the FALSE pathway is traversed and the shipper is classified as a "timely shipper," according to leaf node 907. Alternatively, if the percentage of early manifests in the past X months was greater or equal to 70%, then the TRUE pathway is traversed and the shipper is classified as an "early shipper." The decision tree 904 illustrates that the "winning" leaf node is node 903, indicating that the user is a "late shipper," based on historical data that indicates his percentage of late manifests has historically been greater or equal to 80%. Classifying the particular shipper as a "late" shipper may help predict that the next shipment from the same and/or additional users will likely be received later than the stated package manifest. Identical principles apply to "early" and "timely" shipper classifications.

In various embodiments, the decision trees 906 and/or 902 include different branch and/or root nodes and tests compared to the decision tree 904, but have the same leaf nodes. Accordingly, for example, decision tree 906 can additionally or alternatively include a branch or root node that has a test labeled, "the current month is December." If the current month is December, then a TRUE pathway can be traversed in order to classify that a shipment will likely be late (i.e., a late shipper) regardless of the history of the past X months. This may be because the particular user, for example, may have been an early and/or timely shipper in every month except for the month of December during the past 4 years. Accordingly, the shipper may be classified as a "late" shipper in decision tree 906, but an "early" shipper according to decision tree 904. In another example, the decision tree 902 may additionally or alternatively include a root and/or branch node test that is labeled "the shipment item is a large box." For example, a user may historically ship envelopes on time according to package manifest information, but may always ship large boxes late. Accordingly, if the item to be shipped is a large box, the decision tree 902 may classify the shipper as a "late" shipper, whereas if the item to be shipped is an envelope, the decision tree 902 may classify the shipper as an "early" shipper.

FIG. 9 also illustrates that the majority vote winner is the "early shipper" classification. Decision tree 906 indicates that the shipper has been classified as an "early shipper" as indicated by the dotted lines around the leaf node 908. However, the decision tree 904 indicates that the shipper has been classified as a "late shipper" as indicated via the dotted lines around the leaf node 903. The decision tree 902 indicates that the shipper is classified as an "early shipper" as indicated by the dotted lines around the leaf node 110. Accordingly, the system tallies up the scores—there are 2 "early shipper" classifications compared to only 1 "late shipper" classification. Because the majority of decision trees indicate that the shipper is an "early shipper," (2 compared to 1) the system predicts that overall the shipper is an "early shipper" or that when a shipment package manifest is received for the shipper, the shipper will likely ship earlier than the package manifest and/or the parcel will be received earlier than expected.

Figure 10A:
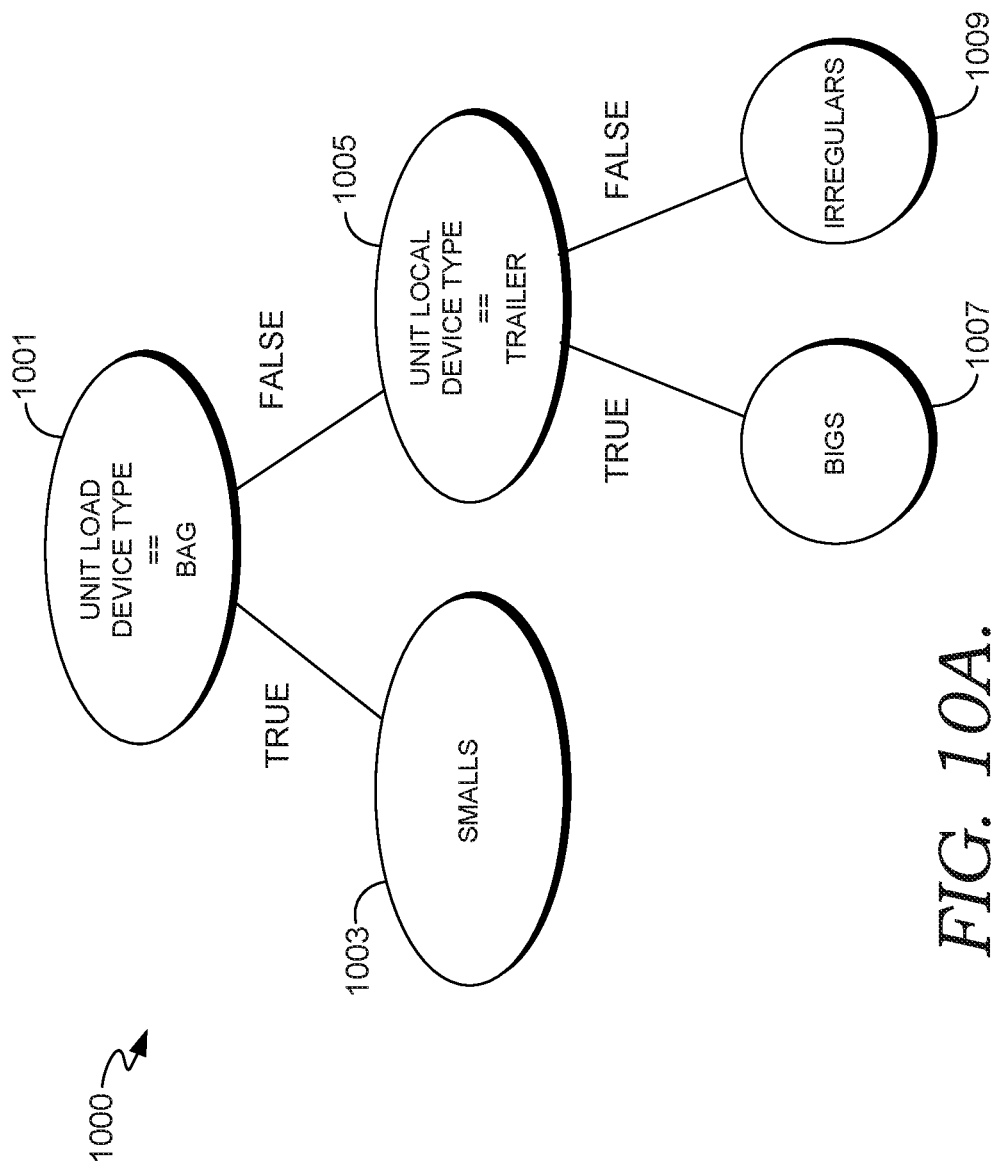
FIG. 10A illustrates a decision tree, in which aspects of the present disclosure are employed in, according to particular embodiments.
Figure 10B:
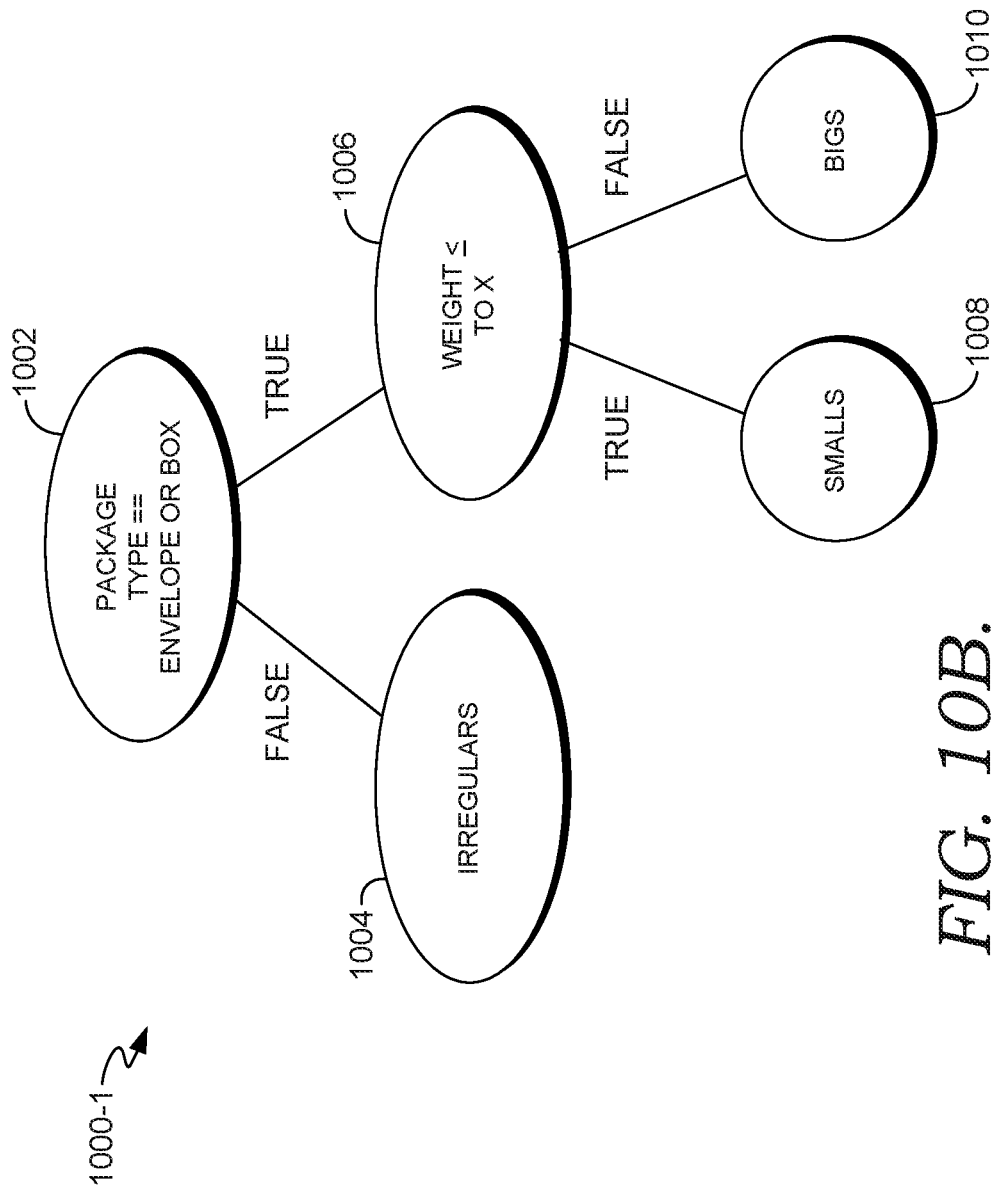
FIG. 10B illustrates another decision tree, in which aspects of the present disclosure are employed in, according to particular embodiments.
Figure 10C:
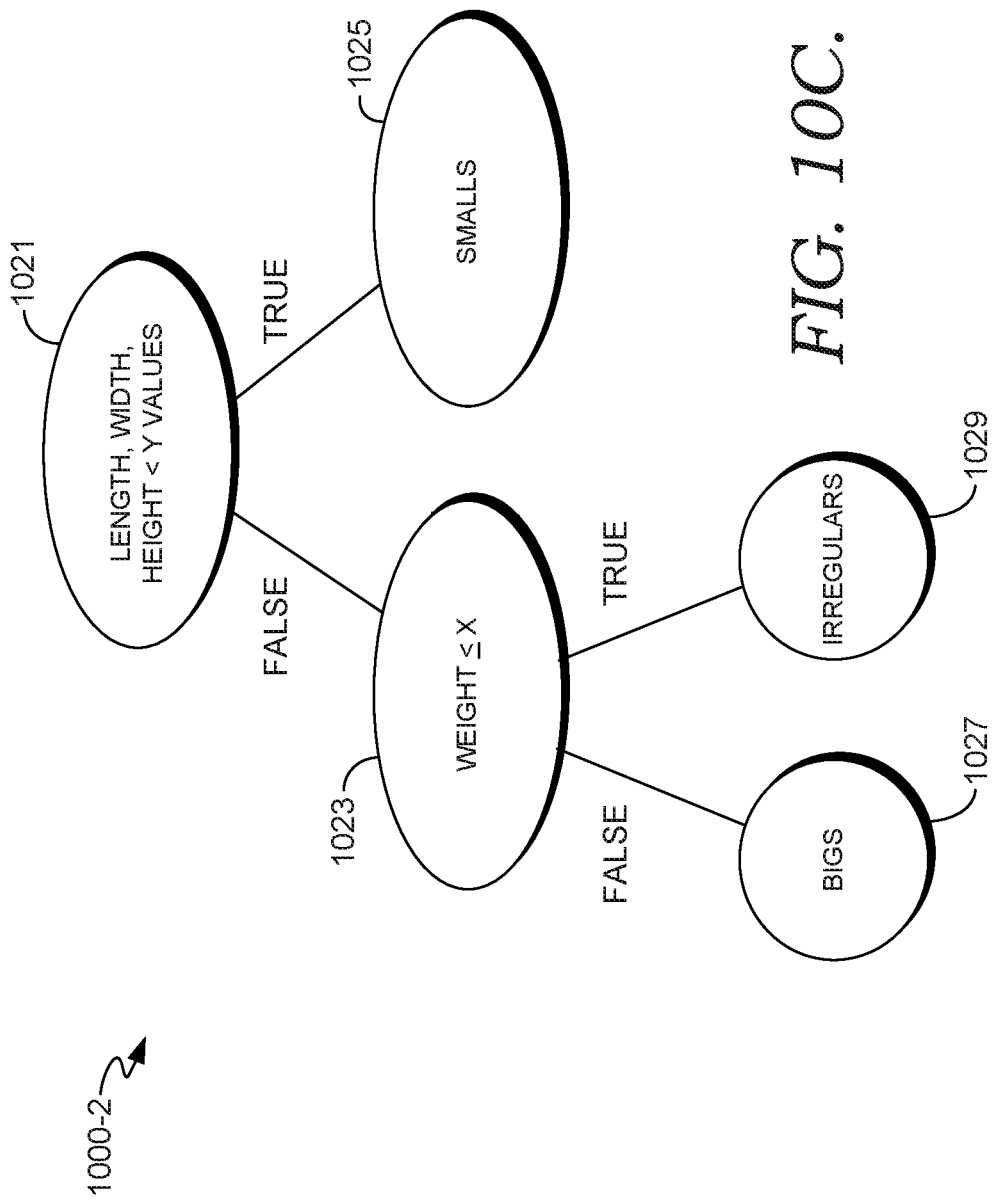
FIG. 10C illustrates yet another decision tree, in which aspects of the present disclosure are employed in, according to particular embodiments.
Figure 11:
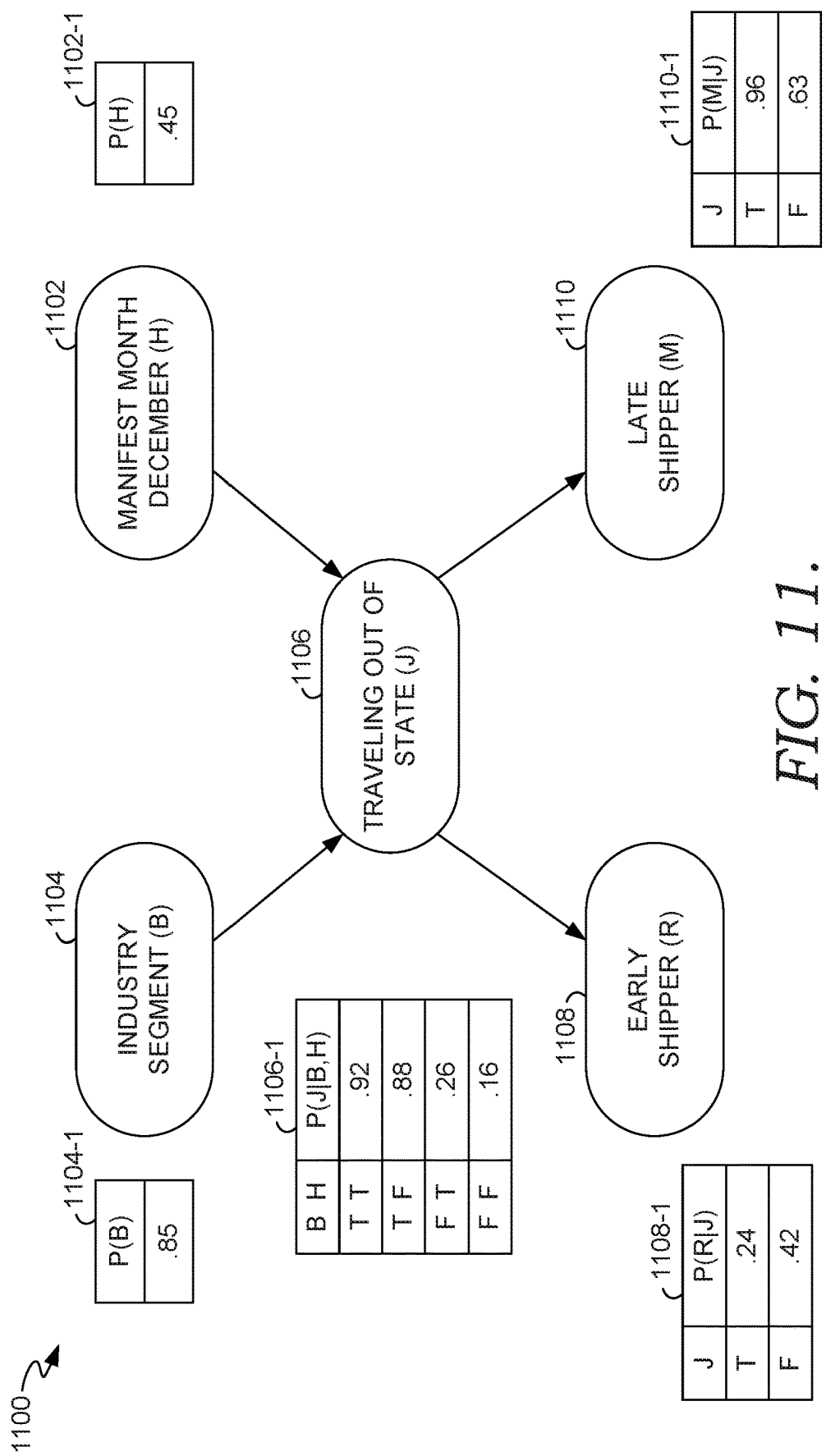
FIG. 11 is a schematic diagram of a directed acyclic graph, representing how learning can occur, according to particular embodiments.

FIGS. 10A-10C describe different decision trees of a single random forest that are used to predict whether a received parcel will be a small parcel (i.e., smalls), a large parcel (i.e., bigs), or an irregular parcel. An irregular parcel is a parcel that does not conform to a symmetrical dimensional shape, but is rather asymmetrical. A symmetrical shape may be a package cube or rectangular prism with even dimensions on each side or an envelope. An asymmetrical shipping item may be a free-standing item that is not within any package, such as a small statue, guitar, etc. In various embodiments, each decision tree within FIGS. 10A-10C uses information in a package manifest in order to traverse the trees according to the tests.

FIG. 10A illustrates the decision tree 1000, in which aspects of the present disclosure are employed in. The root node 1001 is associated with a test that is used to determine whether a unit load device type is a bag. A "unit load device" is the mechanism that is used to load or carry the item to be shipped. Examples of unit load devices include trailers, bags, containers, etc. If the unit load device type is a bag per the test of the root node 1001, then the TRUE pathway is traversed to arrive at the leaf node 1003 labeled "smalls." Alternatively, if the unit load device type is not a bag, then the FALSE pathway is traversed to arrive at the branch node 1005 associated with another test labeled that the unit load device type is a trailer. If the item to be shipped by a customer is a trailer, then the TRUE pathway is traversed to arrive at the "bigs" leaf node 1007. Alternatively, if the unit load device type is not a trailer, then the FALSE pathway is traversed to arrive at the "irregulars" leaf node 1009.

FIG. 10B illustrates the decision tree 1000-1, in which aspects of the present disclosure are employed in. The root node 1002 is associated with a test that is used to determine whether a package type is an envelope or box. If the package type is not an envelope or box per the test of the root node 1002, then the FALSE pathway is traversed to arrive at the leaf node 1004 labeled "irregulars." Alternatively, if the package type is an envelope or box, then the TRUE pathway is traversed to arrive at the branch node 1006 associated with another test labeled that the weight of the item to be shipped is less than or equal to X (e.g., 2 pounds). If the item to be shipped by a customer is less than or equal to X, then the TRUE pathway is traversed to arrive at the "smalls" leaf node 1008. Alternatively, if the weight is not less than or equal to X, then the FALSE pathway is traversed to arrive at the "bigs" leaf node 1010.

FIG. 10C illustrates the decision tree 1000-2. The root node 1021 is associated with a test that is used to determine whether the length, width and/or height is less than Y values. If the length, width, and/or height of a shipment parcel is less than Y values (e.g., length <1 foot, width <1 foot, height less than 2 feet) per the test of the root node 1002, then the TRUE pathway is traversed to arrive at the leaf node 1025 labeled "smalls." Alternatively, if the length, width, and/or height is not less than Y values, then the FALSE pathway is traversed to arrive at the branch node 1023 associated with another test labeled that the weight of the item to be shipped is less than or equal to X (e.g., 2 pounds). It is recognized that the branch node 1023 is the same as branch node 1006 of FIG. 10B. Accordingly, in some embodiments the same nodes or tests are used in different decision trees notwithstanding that other nodes or tests are different for each decision tree. If the item to be shipped by a customer is less than or equal to X, then the TRUE pathway is traversed to arrive at the "irregulars" leaf node 1029. Alternatively, if the weight is not less than or equal to X, then the FALSE pathway is traversed to arrive at the "bigs" leaf node 1027.

FIG. 11 is a schematic diagram of a directed acyclic graph, representing how learning can occur according to some embodiments. In embodiments, the acyclic graph corresponds to algorithms that are employed by the learning model 710 of FIGS. 7 and 8 and/or used to make the predictions as described in FIGS. 4-6. It is understood that although the learning is illustrated by the directed acyclic graph in these embodiments, other models can be used instead of or in addition to the directed acyclic graph. For example, learning can occur via one or more of: neural networks, undirected graphs, linear regression models, logistic regression models, support vector machines, etc. It is also understood that the directed acyclic graph of FIG. 11 can include more or less nodes with additional or different descriptors.

In some embodiments, the directed acyclic graph of FIG. 11 represents a Bayesian network graph. A Bayesian network graph maps the relationships between nodes (i.e., events) in terms of probability. These graphs show how the occurrence of particular events influence the probability of other events occurring. Each node is also conditionally independent of its non-descendants. These graphs follow the underlying principle of Bayes' theorem, represented as:

$$P(A|B) = \frac{P(B|A)P(A)}{P(B)}, \quad \text{Equation 1}$$

where A and B are events and $P(B) \neq 0$. That is, the probability (P) of A given B=the probability of B given A multiplied by the probability of (A) all over the probability of B.

The directed acyclic graph includes various nodes, directed edges, and conditional probability tables. The node 1104 and its conditional probability table 1104-1 illustrate that there is an 85% chance given the current circumstances that a shipper works in industry segment (B) (e.g. the airlines industry). This probability can be obtained, for example, by obtaining information from a package manifest of a shipper and the shipper indicates the name of the company he/she works for.

The node 1102 and its conditional probability table 1102-1 indicate that there is only a <1% probability that the current manifest month is December. This probability or any other probability described herein can be obtained, for example, by scraping historical calendaring information off of a user device, package manifest information, calendars, etc. The node 1106 traveling out of state (J) and its conditional probability table 1106-1 show the probability that a shipper will be travelling out of state (J) given the variables (B) and/or (H) being true (occurring) or false (not occurring). The conditional probability table 1106-1 illustrates that if (B) and (H) are both true, there is a 92% chance that the shipper will travel out of state (J). If (B) is true and (H) is false, there is an 88% chance of (J) occurring. If (B) is false, and (H) is true, there is only a 26% chance of (J) occurring. If (B) and (P) are both false, there is only a 16% chance of (J) occurring.

The node 1108 early shipper (R) and its conditional probability table 1108-1 illustrate the probability that the shipper will be an early shipper (R) given that the shipper has or has not traveled out of the state (J). The conditional probability table 1108-1 illustrates that if (J) is true, the shipper has a 24% probability that he/she will drop off his/her package early or the package will be received early (e.g., compared to the package manifest projected drop off time). Further, if (J) is false, the user has a 42% probability that the package will be dropped off/received early.

The node 1110 late shipper (M) and its conditional probability table 1110-1 illustrate the probability that the user will be a late shipper (M) given that the user has or has not travelled out of state (J). The conditional probability table 1110-1 illustrates that the probability of (M) occurring given that (J) is true is 96%. And the probability of (M) occurring given that (J) is not true is only 63%.

Each of these calculations (and any of the predictions described herein) can be used to generate predictions that a shipper item will be sent/received at an early or late time and or other predictions, such as size of a package. This may help carrier staff members, such as sorting facilities, prepare for a predicted high or low workload. For example, if it is predicted that various shipping items will be received at an unusually high rate for a particular month, the carrier team can ensure that more workers will be available during the month.

In some embodiments, the methods, apparatus, and computer program products described herein comprise or utilize a shipper behavior prediction engine configured to: access one or more shipper information units from a shipper behavioral data management tool, wherein the one or more shipper information units comprise shipper behavioral data associated with a shipper, wherein the shipper behavioral data comprises one or more of: package received time, manifest package time, and package information; extract one or more features from the one or more shipper information units, wherein the one or more features are representative of one or more of a package received time, a manifest package time, or package information; and generate, using a shipper behavior learning model and the one or more features, an output comprising a shipper behavior prediction for the shipper.

Optionally, in some embodiments of the present disclosure, the shipper behavior prediction for the shipper comprises at least one probability score for the shipper, each of the at least one probability score comprising a probability that the shipper comprises a member of a corresponding shipper class.

Optionally, in some embodiments of the present disclosure, the shipper class classifies the shipper as a timely shipper, an early shipper, or a late shipper.

Optionally, in some embodiments of the present disclosure, the classification of a particular shipper as a member of the different shipper classes is based on an expected time difference between a package received time for the particular shipper and a manifest package time for the particular shipper.

Optionally, in some embodiments of the present disclosure, the shipper behavior learning model is a random forest based learning model.

Optionally, in some embodiments of the present disclosure, the random forest based learning model has parameters comprising one or more of a maximum depth or a defined number of trees.

Optionally, in some embodiments of the present disclosure, the shipper behavior learning model is a gradient boosting based learning model.

Optionally, in some embodiments of the present disclosure, the gradient boosting based learning model comprises at least the following parameters: a number of shipper classes, a maximum depth of a tree, a learning rate, one or more probability estimates of the output, a logarithmic loss, and a number of rounds during which to apply a base learning algorithm.

Optionally, in some embodiments of the present disclosure, the output further comprises a probability of package timeliness at sort.

Optionally, in some embodiments of the present disclosure, the shipper behavior prediction engine is further configured to: receiving additional shipper behavioral data after a particular future time period; extracting one or more features from the additional shipper behavioral data; and updating the shipper behavior prediction engine based on the features extracted from additional shipper behavioral data.

Optionally, in some embodiments of the present disclosure, the system or method, further comprises a training engine configured to: receive additional shipper behavioral data after a particular future time period; extract one or more features from the additional shipper behavioral data; access historical data to generate a historical data set for one or more historical shipper behavior prediction; extract one or more features from the historical data set; comparing the one or more features extracted from the additional shipper behavioral data with the one or more features extracted from the historical data set; modify the shipper behavior learning model stored in the shipper behavior prediction engine based on the comparison of the one or more features extracted from the additional shipper behavioral data and said one or more features extracted from the historical data set.

Optionally, in some embodiments of the present disclosure, the shipper behavioral data comprises one or more tracking number, package activity time stamp, package manifest time, service type, package dimension, package height, package width, package length, or account number associated with a shipper.

Optionally, in some embodiments of the present disclosure, the features extracted from the one or more shipper information units comprise one or more of a residential indicator, a hazardous material indicator, an oversize indicator, a document indicator, a Saturday delivery indicator, a return service indicator, an origin location codes, a set of destination location codes, a package activity time stamp, a set of scanned package dimensions, and a set of manifest package dimensions.

VIII. CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. An apparatus for autonomously predicting shipper behavior, the apparatus comprising: at least one non-transitory computer-readable storage medium that includes program instructions, the program instructions being executable by one or more processors to cause the one or more processors to:
    parse, via the one or more processors executing a parsing module, raw shipper behavior data into a first set of shipper information units that are to be used by a shipper behavior learning model and a second set of shipper information units that are not to be used by the shipper behavior learning model;
    in response to the parsing, normalize, via the one or more processors executing a normalization module, the first set of information units;
    based on the parsing and the normalizing, train the shipper behavior model to recognize patterns within the first set of information units associated with one or more shipper classes;
    access the first set of shipper information units from a shipper behavioral data management tool, wherein the first set of shipper information units comprise shipper behavioral data associated with a shipper, wherein the shipper behavioral data comprises one or more of: package received time, manifest package time, or package information;
    extract one or more features from the one or more shipper information units; and
    generate, via a shipper behavior learning model and the one or more features, an output comprising at least one probability score for the shipper, each of the at least one probability score comprising a probability that the shipper comprises a member of a corresponding shipper class.

2. The apparatus of claim 1, wherein the features extracted from the first set of shipper information units comprise one or more of a residential indicator, a hazardous material indicator, an oversize indicator, a document indicator, a Saturday delivery indicator, a return service indicator, an origin location codes, a set of destination location codes, a package activity time stamp, a set of scanned package dimensions, or a set of manifest package dimensions.

3. The apparatus of claim 1, wherein the shipper class classifies the shipper as a timely shipper, an early shipper, or a late shipper.

4. The apparatus of claim 3, wherein classification of a particular shipper as a member of the different shipper classes is based on an expected time difference between a package received time for the particular shipper and a package manifest time for the particular shipper.

5. The apparatus of claim 1, wherein the shipper behavior learning model includes a random forest based learning model.

6. The apparatus of claim 5, wherein the random forest based learning model has parameters comprising one or more of a maximum depth or a defined number of trees.

7. The apparatus of claim 1, wherein the shipper behavior learning model includes a gradient boosting based learning model.

8. The apparatus of claim 7, wherein the gradient boosting based learning model comprises at least the following parameters: a number of shipper classes, a maximum depth of a tree, a learning rate, one or more probability estimates of the output, a logarithmic loss, and a number of rounds during which to apply a base learning algorithm.

9. The apparatus of claim 1, wherein the output further comprises a probability of package timeliness at sort.

10. The apparatus of claim 1, wherein the program instructions further cause the one or more processors to:
receive additional shipper behavioral data subsequent to the accessing of the first set of shipper information units;
extract one or more features from the additional shipper behavioral data; and
update the shipper behavior learning model based on the features extracted from additional shipper behavioral data.

11. The apparatus of claim 1, wherein the program instructions further cause the one or more processors to:
receive additional shipper behavioral data subsequent to the accessing of the first set of shipper information units;
extract one or more features from the additional shipper behavioral data;
access historical data to generate a historical data set for one or more historical shipper behavior prediction;
extract one or more features from the historical data set;
compare the one or more features extracted from the additional shipper behavioral data with the one or more features extracted from the historical data set; and
modify the shipper behavior learning model stored in the shipper behavior based on the comparison of the one or more features extracted from the additional shipper behavioral data with the one or more features extracted from the historical data set.

12. The apparatus of claim 1, wherein the shipper behavioral data comprises one or more of: tracking number, package activity time stamp, package manifest time, service type, package dimension, package height, package width, package length, or account number associated with a shipper.

13. A system comprising:
at least one computing device having at least one processor; and
at least one computer readable storage medium having program instructions embodied therewith, the program instructions readable/executable by the at least one processor to cause the system to:
generate one or more learning models;
extract shipper behavior data, the shipper behavior data includes a plurality of features of at least one package associated with one or more shipping operations of at least one shipper; and
generate a prediction output corresponding to a size of the at least one package based at least in part on running the plurality of features of the at least one package through the one or more learning models.

14. A method for autonomously predicting shipper behavior, the method comprising:
training one or more learning models to recognize how timely various shippers are;
extracting shipper behavior data for at least one shipper, the shipper behavior data includes a plurality of features associated with the at least one shipper scheduled to ship one or more parcels; and
based on the training and the extracting, generating at least one probability score for the at least one shipper, each of the at least one probability score comprising a probability that the shipper comprises a member of a corresponding shipper class associated with timeliness.

15. The method of claim 14, wherein the shipper behavioral data includes one or more of a residential indicator, a hazardous material indicator, an oversize indicator, a document indicator, a Saturday delivery indicator, a return service indicator, an origin location codes, a set of destination location codes, a package activity time stamp, a set of scanned package dimensions, and a set of manifest package dimensions.

16. The method of claim 14, wherein the shipper class classifies the shipper as a timely shipper, an early shipper, or a late shipper.

17. The method of claim 14, wherein the shipper behavior learning model is a gradient boosting based learning model.

18. The method of claim 14, wherein the one or more learning models includes a plurality of decision trees, wherein each of the plurality of decision trees include a plurality of leaf nodes that are labelled as a timely shipper, an early shipper, and a late shipper.

* * * * *